United States Patent
Mizuta et al.

(10) Patent No.: US 10,441,883 B2
(45) Date of Patent: Oct. 15, 2019

(54) INFORMATION PROCESSING SYSTEM, NON-TRANSITORY STORAGE MEDIUM HAVING INFORMATION PROCESSING PROGRAM STORED THEREIN, INFORMATION PROCESSING APPARATUS, AND INFORMATION PROCESSING METHOD

(71) Applicant: NINTENDO CO., LTD., Kyoto (JP)

(72) Inventors: Masato Mizuta, Kyoto (JP); Yusuke Akifusa, Kyoto (JP); Taku Matoba, Kyoto (JP); Yuki Hashizume, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 116 days.

(21) Appl. No.: 15/726,688

(22) Filed: Oct. 6, 2017

(65) Prior Publication Data

US 2018/0178119 A1    Jun. 28, 2018

(30) Foreign Application Priority Data

Dec. 28, 2016    (JP) .................................. 2016-255274

(51) Int. Cl.
*A63F 13/285*    (2014.01)
*A63F 13/50*    (2014.01)
(Continued)

(52) U.S. Cl.
CPC .......... *A63F 13/285* (2014.09); *A63F 13/211* (2014.09); *A63F 13/24* (2014.09);
(Continued)

(58) Field of Classification Search
USPC ........................................... 463/30
See application file for complete search history.

(56) References Cited

U.S. PATENT DOCUMENTS

2013/0038603 A1    2/2013  Bae
2013/0296053 A1*   11/2013 Rasmussen ............ G07F 17/32
                                                 463/31
(Continued)

FOREIGN PATENT DOCUMENTS

JP    2008-000345       1/2008
JP    2010-503461 A     2/2010
(Continued)

OTHER PUBLICATIONS

Notice of Reasons for Refusal, dated Oct. 30, 2018, issued in Japanese Patent Application No. 2016-255274, 5 pages.

*Primary Examiner* — Pierre E Elisca
(74) *Attorney, Agent, or Firm* — Nixon & Vanderhye P.C.

(57) ABSTRACT

A movement calculation section calculates a movement of a virtual object according to an orientation and/or a motion, of a controller, calculated by an orientation/motion calculation section. A waveform generation section generates a vibration waveform based on a state, of a movement of the virtual object, obtained when the virtual object is in contact with another object, or comes into contact with another object. A waveform output section combines a plurality of vibration waveforms generated by the waveform generation section with each other, and outputs a signal representing a combined waveform obtained by the combination to a vibrator of the controller.

28 Claims, 22 Drawing Sheets

(51) Int. Cl.
*A63F 13/211* (2014.01)
*A63F 13/24* (2014.01)
*A63F 13/54* (2014.01)
*A63F 13/577* (2014.01)

(52) U.S. Cl.
CPC .............. *A63F 13/50* (2014.09); *A63F 13/54* (2014.09); *A63F 13/577* (2014.09); *A63F 2300/302* (2013.01)

(56) References Cited

U.S. PATENT DOCUMENTS

| | | | |
|---|---|---|---|
| 2016/0048209 A1* | 2/2016 | Park | G06F 1/1626 345/173 |
| 2016/0310844 A1 | 10/2016 | Yamashita et al. | |
| 2017/0087458 A1 | 3/2017 | Nakagawa et al. | |
| 2017/0293361 A1* | 10/2017 | Lee | G06F 3/016 |
| 2018/0301001 A1* | 10/2018 | Knott | G06N 3/084 |

FOREIGN PATENT DOCUMENTS

| | | |
|---|---|---|
| JP | 2011-159110 A | 8/2011 |
| JP | WO2015/145893 A1 | 10/2015 |
| JP | 2016-202486 A | 12/2016 |
| WO | 2008/033493 A2 | 3/2008 |
| WO | 2015/143124 A1 | 9/2015 |

* cited by examiner

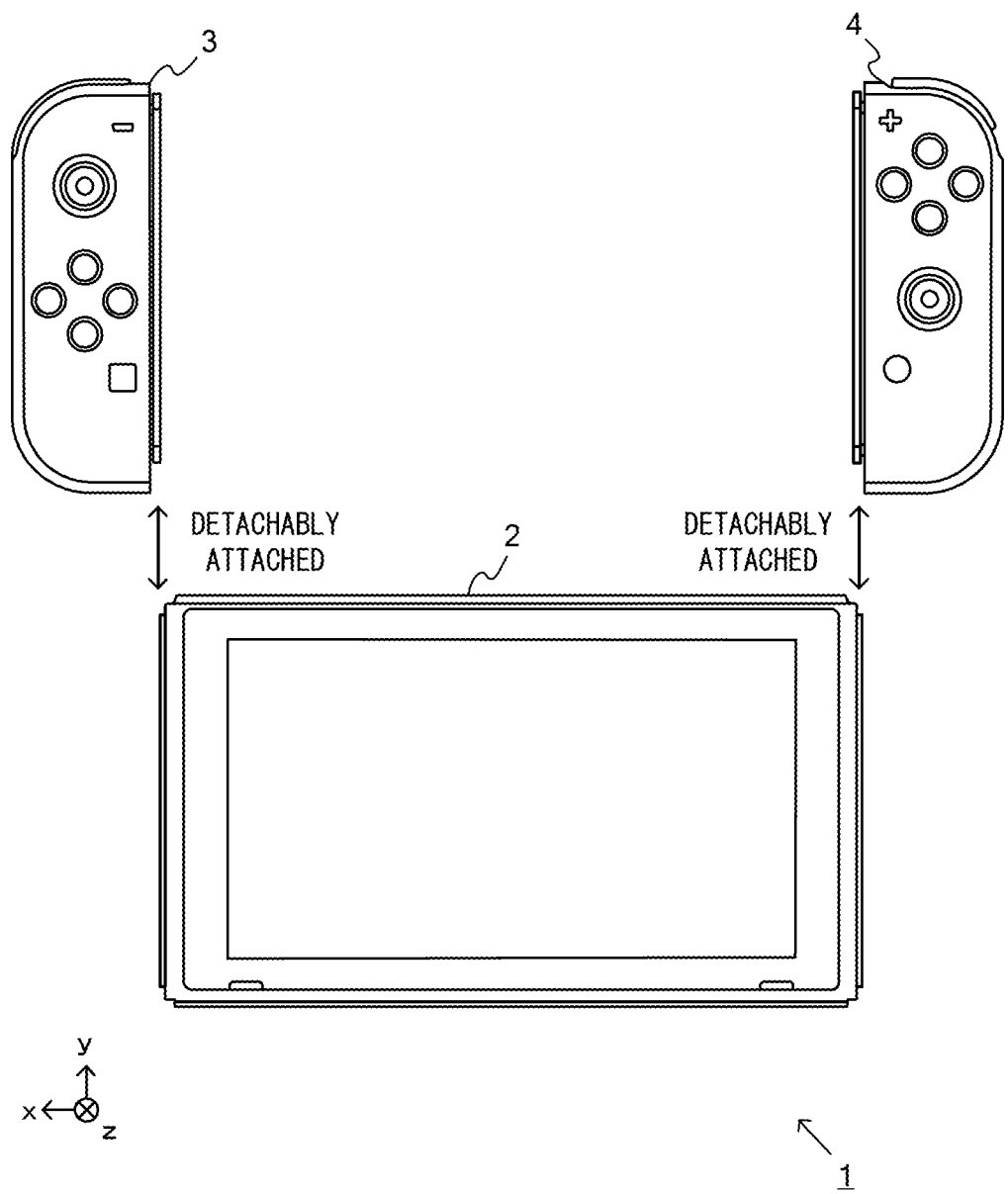

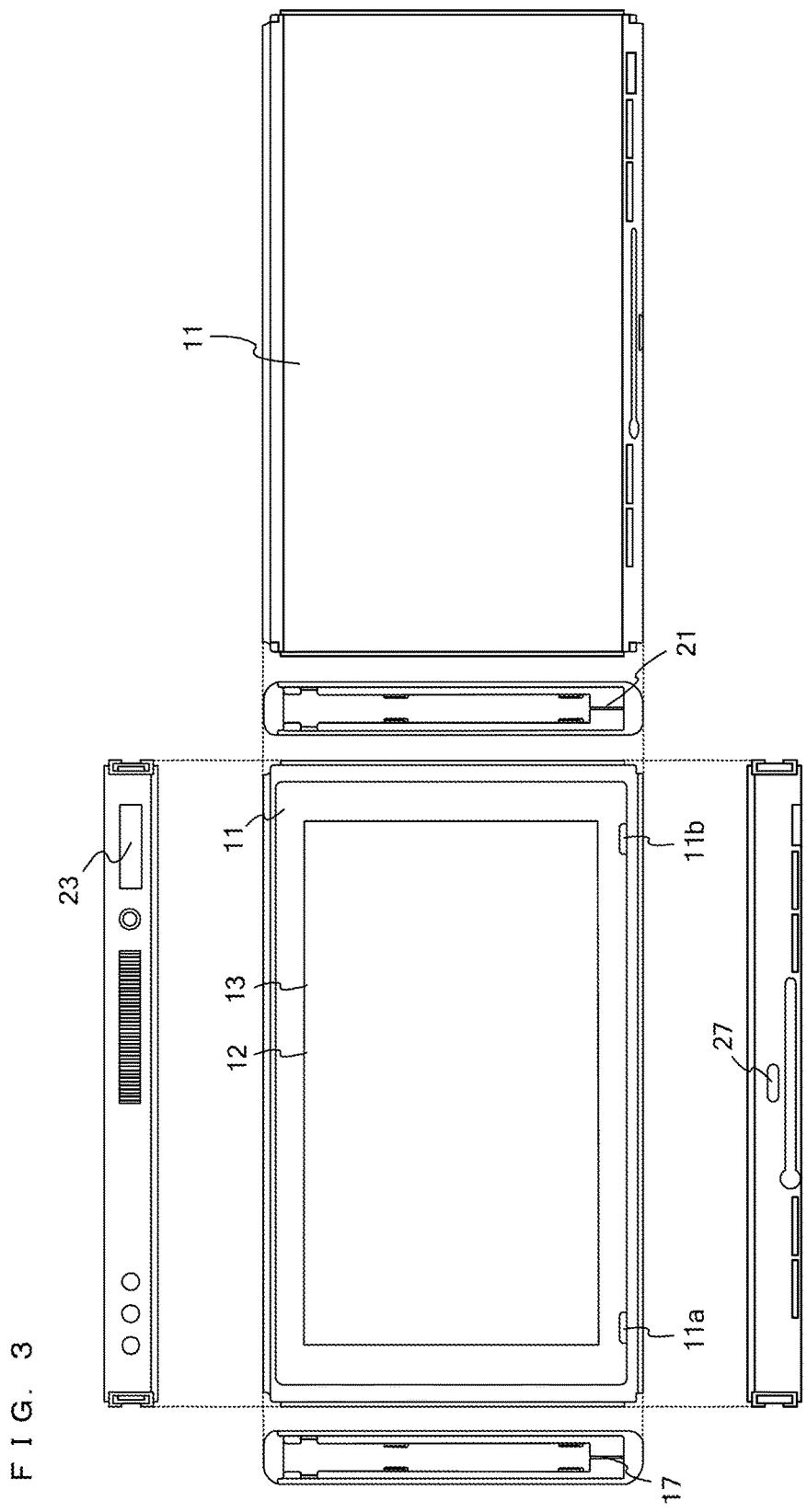

F I G. 8
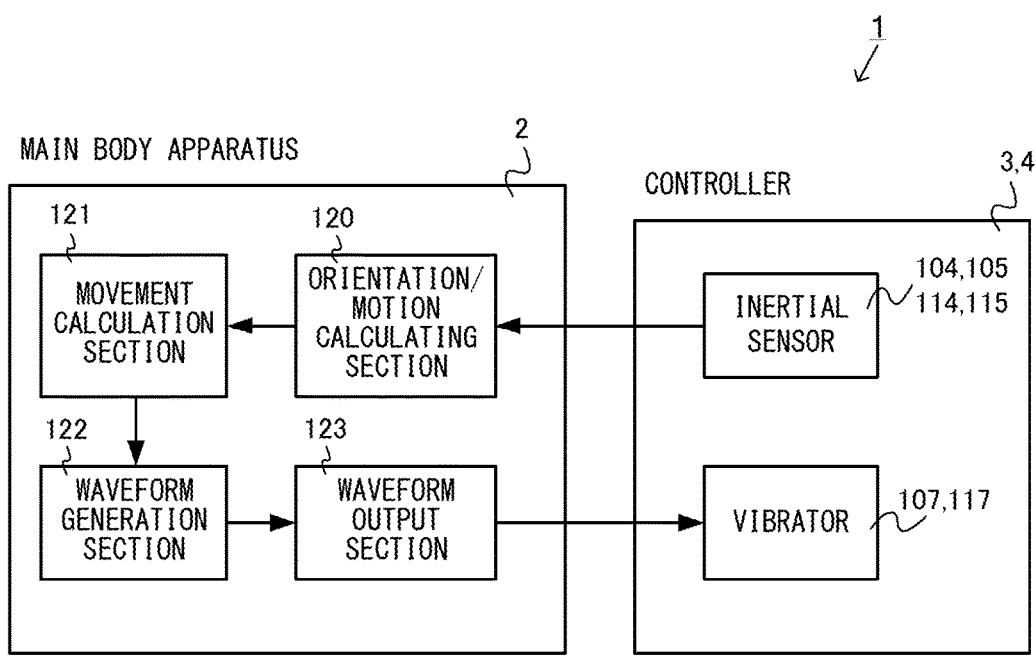

F I G. 10
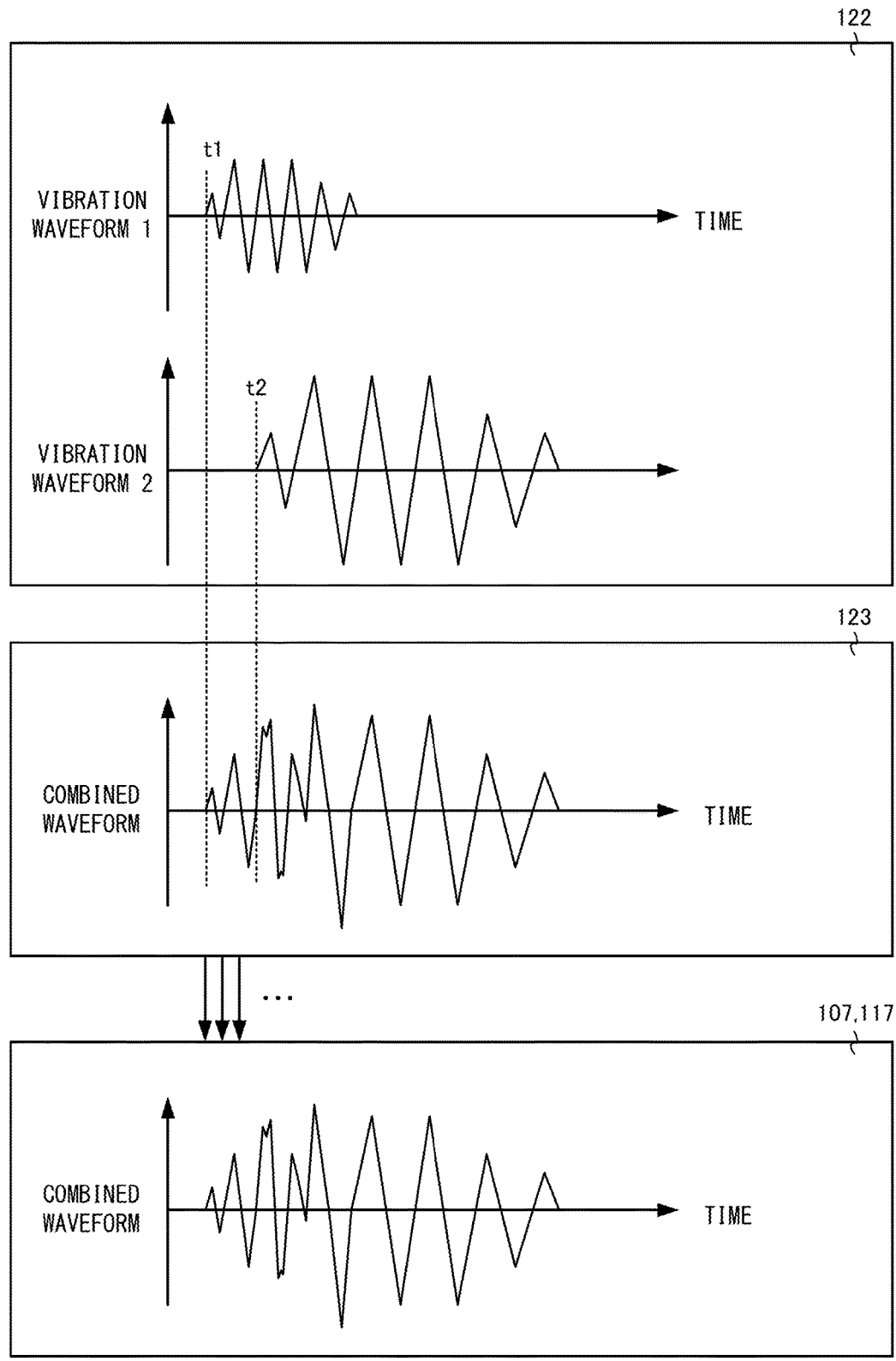

FIG. 12
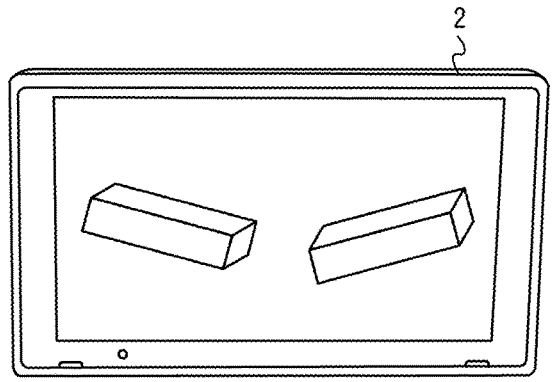
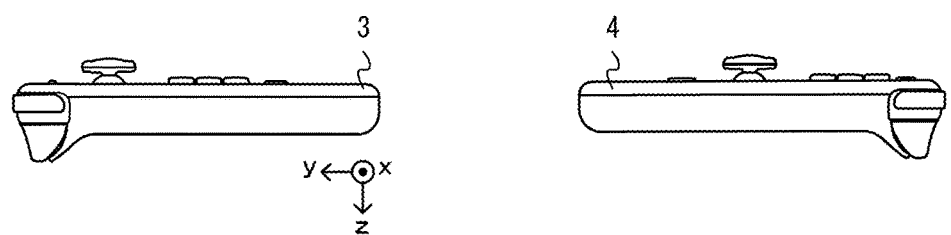
FIG. 13
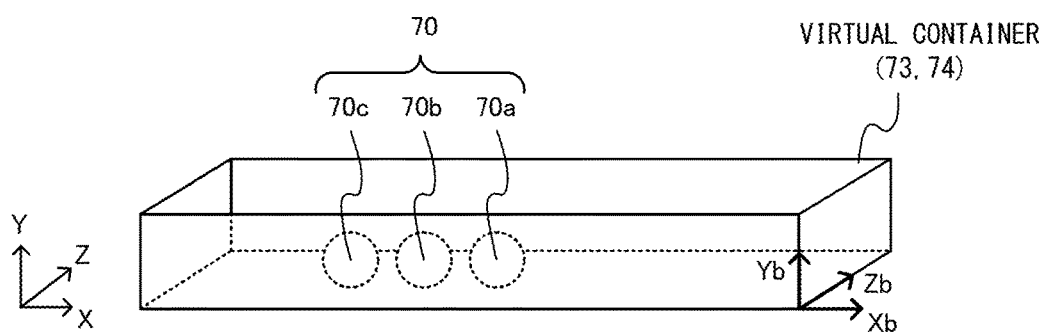

FIG. 15
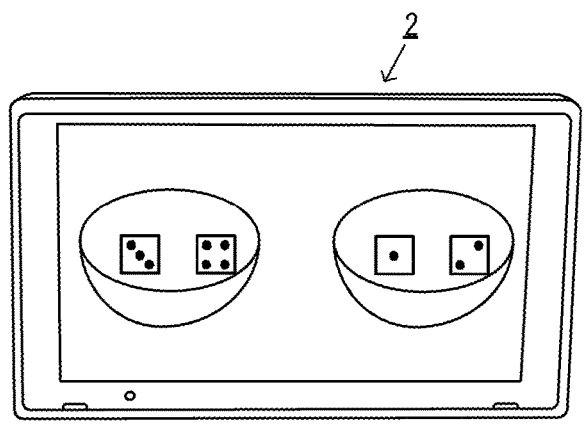
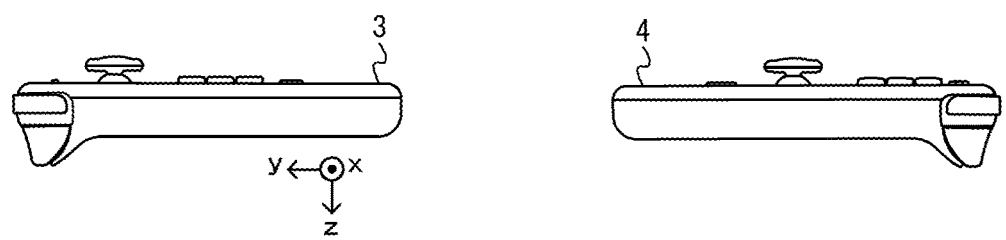

FIG. 20

LIST OF VIBRATION PATTERNS OF VIBRATION
BASED ON MOVEMENT OF REPRESENTATIVE POINT

| STATE OF MOVEMENT OF REPRESENTATIVE POINT | | VIBRATION PATTERN DATA | | |
|---|---|---|---|---|
| MOVEMENT OF REPRESENTATIVE POINT | | PATTERN P1 | PATTERN P2 | PATTERN P3 |
| COLLISION OF REPRESENTATIVE POINT | GREAT | PATTERN P4 | PATTERN P5 | PATTERN P6 |
| | MEDIUM | PATTERN P7 | PATTERN P8 | PATTERN P9 |
| | SMALL | PATTERN P10 | PATTERN P11 | PATTERN P12 |

FIG. 21

LIST OF VIBRATION PATTERNS OF VIBRATION
BASED ON VALUE OF ACCELERATION

| VALUE OF ACCELERATION | VIBRATION PATTERN DATA | | |
|---|---|---|---|
| GREAT | PATTERN P13 | PATTERN P14 | PATTERN P15 |
| MEDIUM | PATTERN P16 | PATTERN P17 | PATTERN P18 |
| SMALL | PATTERN P19 | PATTERN P20 | PATTERN P21 |

F I G. 2 2
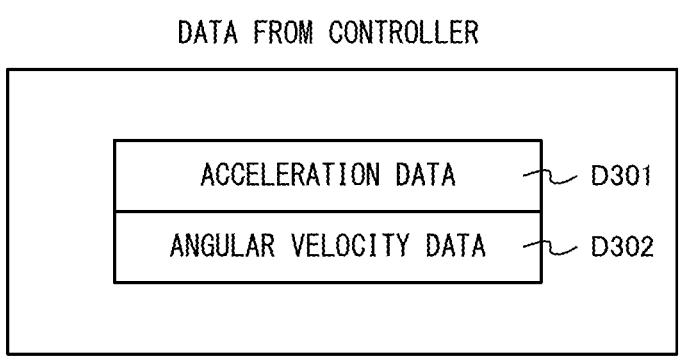
F I G. 2 3
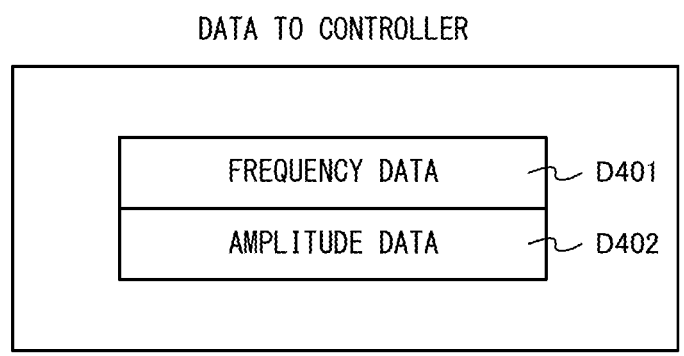

INFORMATION PROCESSING SYSTEM, NON-TRANSITORY STORAGE MEDIUM HAVING INFORMATION PROCESSING PROGRAM STORED THEREIN, INFORMATION PROCESSING APPARATUS, AND INFORMATION PROCESSING METHOD

CROSS REFERENCE TO RELATED APPLICATION

The disclosures of Japanese Patent Application No. 2016-255274, filed on Dec. 28, 2016, are incorporated herein by reference.

FIELD

The technique shown here relates to an information processing system, a non-transitory storage medium having an information processing program stored therein, an information processing apparatus, and an information processing method.

BACKGROUND AND SUMMARY

To date, a technique in which a position on a screen is designated by using an input device, and the input device is vibrated when a predetermined place is designated, has been known.

However, in the above-described conventional technique, occurrence or non-occurrence of vibration is merely selected according to the designated position, and virtual object movement is not perceived according to the vibration.

Therefore, an object of the exemplary embodiment is to provide an information processing system capable of allowing virtual object movement to be perceived according to vibration.

In order to attain the aforementioned object, the exemplary embodiment has the following configuration.

One aspect of the exemplary embodiment is an information processing system that includes an operation section, a vibration section, a movement calculation section, a waveform generation section, and an waveform output section. The vibration section is configured to vibrate according to an input signal representing a vibration waveform. The movement calculation section is configured to sequentially calculate a virtual movement of a virtual object, and change the movement of the virtual object according to an operation performed on the operation section. The waveform generation section is configured to generate a signal representing a vibration waveform based on a state, of a movement of the virtual object, obtained when the virtual object is in contact with another object, or comes into contact with another object, based on calculation by the movement calculation section. The waveform output section is configured to output, to the vibration section, a signal representing a combined waveform obtained by a first vibration waveform and a second vibration waveform being combined with each other, in a case where a signal representing the second vibration waveform is generated by the waveform generation section when a signal representing the first vibration waveform is generated by the waveform generation section.

In the description herein, a "state of a movement of the virtual object" includes a state of a movement such as a speed, an acceleration, rotation, and the like of the virtual object. Further, a "state, of a movement of the virtual object, obtained when the virtual object is in contact with another object" means a state (speed, acceleration, rotation, and the like), of a movement of the virtual object, obtained when a state where the virtual object is in contact with another object is maintained. Further, a "state, of a movement of the virtual object, obtained when the virtual object comes into contact with another object" means a state, (speed, acceleration, rotation, and the like) of a movement of the virtual object (at the moment) when the virtual object contacts with another object.

Further, a "signal representing a vibration waveform" may be, for example, an amplitude and a frequency of the vibration waveform. A "signal representing a vibration waveform" may be a vibration waveform itself, or may be a signal that designates vibration pattern data representing the vibration waveform.

Further, "the first vibration waveform and the second vibration waveform are combined with each other" may mean that, for example, the total of amplitudes of the two vibration waveforms is obtained, and that, for example, an average of frequencies of the two vibration waveforms is obtained (the average may be a weighted average or unweighted average). Further, "the first vibration waveform and the second vibration waveform are combined with each other" may mean that, for example, the first vibration waveform and the second vibration waveform may be superposed on each other according to the superposition principle of wave.

In the above-described configuration, a plurality of vibrations generated by a virtual object and another object contacting with each other can be combined with each other, and various vibrations obtained by movement of an object can be realistically reproduced.

Further, an orientation/motion calculation section configured to calculate an orientation and/or a motion of the operation section may be further provided. The movement calculation section changes the movement of the virtual object based on the orientation and/or the motion of the operation section.

In the above-described configuration, the virtual object can be moved based on an orientation and/or a motion of the operation section.

Further, the operation section may include an inertial sensor. The orientation/motion calculation section may calculate the orientation and/or the motion of the operation section based on data from the inertial sensor.

In the above-described configuration, an orientation and/or a motion of the operation section can be calculated by the inertial sensor.

Further, the waveform generation section may generate a signal representing a vibration waveform based on a movement, of the virtual object, obtained when the virtual object is moving in a state where the virtual object is in contact with said another object.

In the above-described configuration, for example, vibration based on rolling of the virtual object can be generated when the virtual object is rolling on another object.

Further, the waveform generation section may generate, when a collision of the virtual object with said another object occurs, a signal representing a vibration waveform based on the collision.

In the above-described configuration, when a collision of the virtual object with another object occurs, vibration based on the collision can be generated.

Further, the waveform generation section may generate a signal representing a vibration waveform having an amplitude such that the higher a speed of the virtual object is, the greater the amplitude is.

In the above-described configuration, for example, in a case where the virtual object is moving in a state where the virtual object is in contact with another object, the higher the moving speed of the virtual object is, the more strongly the vibration section can be vibrated. Further, for example, in a case where the virtual object collides, the higher the speed at the collision is, the more strongly the vibration section can be vibrated.

Further, the waveform generation section may generate, when a collision of the virtual object with said another object occurs, a signal representing a vibration waveform based on the collision of the virtual object. The waveform output section may output a signal representing a combined waveform obtained by combining a vibration waveform based on the movement of the virtual object with a vibration waveform based on the collision of the virtual object.

In the above-described configuration, a vibration based on a movement of the virtual object and a vibration based on a collision of the virtual object can be combined with each other, and vibration can be realistically reproduced.

Further, the virtual object may include a virtual container object and at least one content object contained in the virtual container object. The movement calculation section may change a movement of the content object by changing an orientation and/or a motion of the virtual container object.

In the above-described configuration, the content object can be moved in the virtual container object, and vibration generated by the movement of the content object in the virtual container object can be reproduced.

Further, the content object may be a plurality of spherical objects. The waveform generation section may generate, when rolling of the plurality of spherical objects in the virtual container object occurs, a signal representing a vibration waveform based on the rolling of each spherical object, and generates, when collision of the plurality of spherical objects occurs, a signal representing a vibration waveform based on the collision of each spherical object.

In the above-described configuration, a plurality of spherical objects can be moved in the virtual container object, and vibration based on rolling of each spherical object and vibration based on collision of each spherical object can be combined with each other, and vibration obtained when a plurality of spherical objects are moved in the container can be reproduced.

Further, the content object may be a rectangular-parallelepiped-shaped object. The waveform generation section may generate, when collision of the rectangular-parallelepiped-shaped object with the virtual container object occurs, a signal representing a vibration waveform based on the collision.

In the above-described configuration, a vibration obtained when the rectangular-parallelepiped-shaped object is moved in the container can be reproduced.

Further, the content object may be a virtual point or grain. The waveform generation section may generate, when a movement of the content object in the virtual container object is performed, a signal representing a vibration waveform based on the movement.

In the above-described configuration, a vibration can be generated according to a movement of a virtual point or grain in the virtual container.

Further, the waveform output section may perform combination of a plurality of vibration waveforms with each other such that the number of the plurality of vibration waveforms is not greater than a predetermined upper limit number, and output, to the vibration section, a signal representing a combined waveform obtained through the combination.

In the above-described configuration, the upper limit can be set for the number of vibration waveforms to be combined.

Further, the information processing system may include an information processing apparatus and an operation device. The operation section and the vibration section may be provided in the operation device. The movement calculation section, the waveform generation section, and the waveform output section may be provided in the information processing apparatus. The information processing apparatus may receive an input from the operation section and transmit an output from the waveform output section to the operation device, through communication with the operation device.

In the above-described configuration, the information processing apparatus calculates a movement of the virtual object according to an operation performed on the operation device having the vibration section, and the operation device can be vibrated according to the result of calculation by the information processing apparatus.

Further, a signal output from the waveform output section may include an amplitude of a waveform per unit time or a difference in an amplitude of a waveform per unit time, and a frequency of the waveform per unit time or a difference in a frequency of the waveform per unit time.

In the above-described configuration, the information processing apparatus can transmit, to the operation device, an amplitude or a difference in an amplitude and a frequency or a difference in a frequency every unit time.

Further, the waveform generation section may generate, as the signal, data representing an amplitude and/or a frequency of vibration, and change the amplitude and/or the frequency in a case where the state of the movement of the virtual object changes when a signal representing a vibration waveform based on the state of the movement of the virtual object is generated.

In the above-described configuration, for example, when the vibration section is vibrating, an amplitude and/or a frequency of vibration of the vibration section can be changed according to an operation performed on the operation section, and an operation performed on the operation section can be reflected in real time.

Further, the movement calculation section may calculate a value representing a movement of the virtual object. A plurality of pieces of vibration pattern data representing the vibration waveform may be prepared. The waveform generation section may select any of the plurality of pieces of vibration pattern data according to the value, and generate a signal representing the vibration waveform, based on the selected vibration pattern data.

In the above-described configuration, any of a plurality of pieces of vibration pattern data can be selected according to the magnitude of a value (for example, the speed of the virtual object) representing the movement of the virtual object, and, for example, the vibration waveform can be changed according to the speed of the virtual object.

Further, the waveform generation section may generate, as the signal, data representing an amplitude and/or a frequency of vibration, and change the amplitude and/or the frequency according to the value.

In the above-described configuration, an amplitude and/or a frequency can be changed according to a value (for example, the speed of the virtual object) representing a movement of the virtual object.

Further, another aspect may be an information processing program executed by a computer of an information processing apparatus that vibrates a vibration section which vibrates according to an input signal representing a vibration waveform. The information processing program causes the computer to execute: a movement calculation step of sequentially calculating a virtual movement of a virtual object, and changing the movement of the virtual object according to an operation performed on an operation section; a waveform generation step of generating a signal representing a vibration waveform based on a state, of a movement of the virtual object, obtained when the virtual object is in contact with another object, or comes into contact with another object, based on calculation in the movement calculation step; and a waveform output step of outputting, to the vibration section, a signal representing a combined waveform obtained by a first vibration waveform and a second vibration waveform being combined with each other, in a case where a signal representing the second vibration waveform is generated in the waveform generation step when a signal representing the first vibration waveform is generated in the waveform generation step.

Another aspect may be an information processing apparatus that executes the information processing program. Further, another aspect may be an information processing method performed by the information processing apparatus or the information processing system.

According to the exemplary embodiment, a virtual movement of a virtual object can be perceived by vibration.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 2 is an example non-limiting diagram showing an example of a state where each of the left controller 3 and the right controller 4 is detached from the main body apparatus 2;

FIG. 3 is example non-limiting six orthogonal views showing an example of the main body apparatus 2;

FIG. 8 is an example non-limiting functional block diagram illustrating vibration control performed by an information processing system 1 of an exemplary embodiment;

FIG. 10 is an example non-limiting diagram conceptually illustrating combining of two vibration waveforms in the case where, when vibration based on one vibration waveform occurs, a signal based on another vibration waveform is generated;

FIG. 12 is an example non-limiting diagram illustrating a state where a first game is performed;

FIG. 13 is an example non-limiting diagram illustrating examples of a virtual object and a virtual container in the first game;

FIG. 15 is an example non-limiting diagram illustrating a state where a second game is performed;

FIG. 20 is an example non-limiting diagram illustrating an example of vibration pattern data of vibration based on movement of the representative point in the third game;

FIG. 21 is an example non-limiting diagram illustrating an example of vibration pattern data of vibration based on the value of an acceleration in the third game;

FIG. 22 is an example non-limiting diagram illustrating an example of data output from the controller;

FIG. 23 is an example non-limiting diagram illustrating an example of data input to the controller;

DETAILED DESCRIPTION OF NON-LIMITING EXAMPLE EMBODIMENTS

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the left controller 3 and the right controller 4 are attached to the main body apparatus 2 and used as a unified apparatus. Further, the main body apparatus 2, the left controller 3, and the right controller 4 can also be used as separate bodies (see FIG. 2). Hereinafter, first, the hardware configuration of the game system according to the exemplary embodiment is described, and then, the control of the game system according to the exemplary embodiment is described.

(Description for Main Body Apparatus, Left Controller, and Right Controller)

Figure 1:
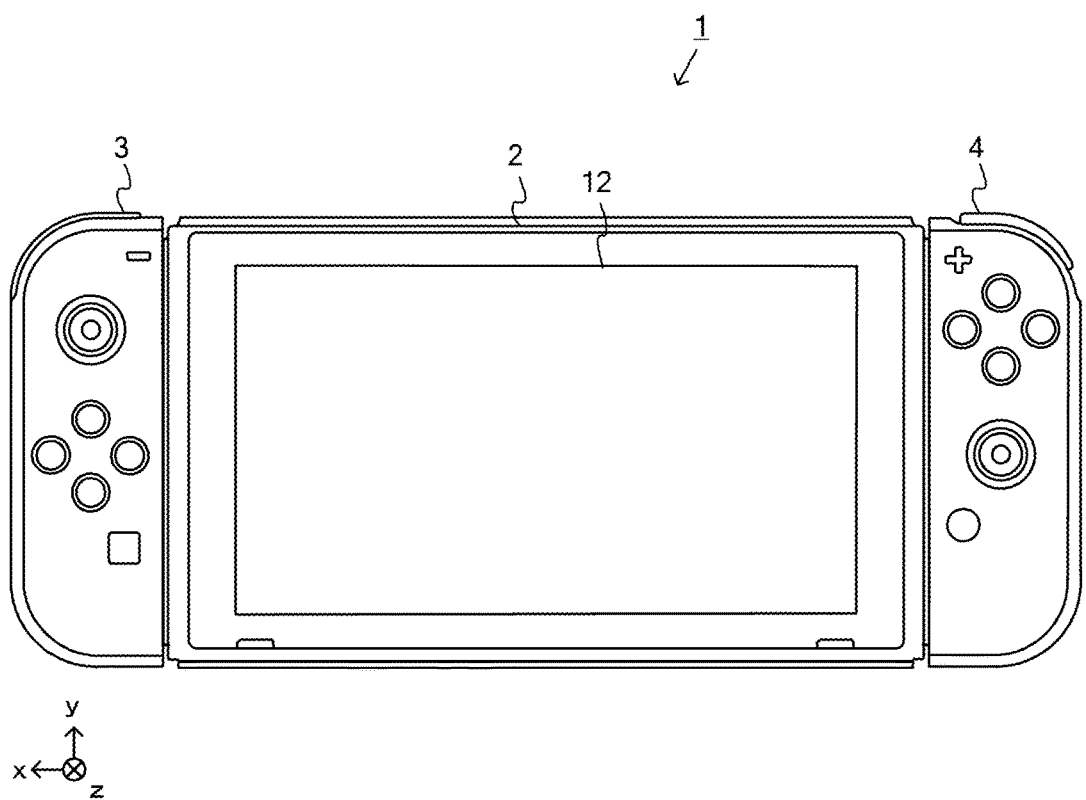
FIG. 1 is an example non-limiting diagram showing a state where a left controller 3 and a right controller 4 are attached to a main body apparatus 2.

FIG. 1 is a diagram showing a state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a first slot 23. The first slot 23 is provided on an upper side surface of the housing 11. The first slot 23 is so shaped as to allow a first type of storage medium to be attached to the first slot 23. The first type of storage medium is, for example, a dedicated storage medium (e.g., a dedicated memory card) for the game system 1 and an information processing apparatus of the same type as the game system 1. The first type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
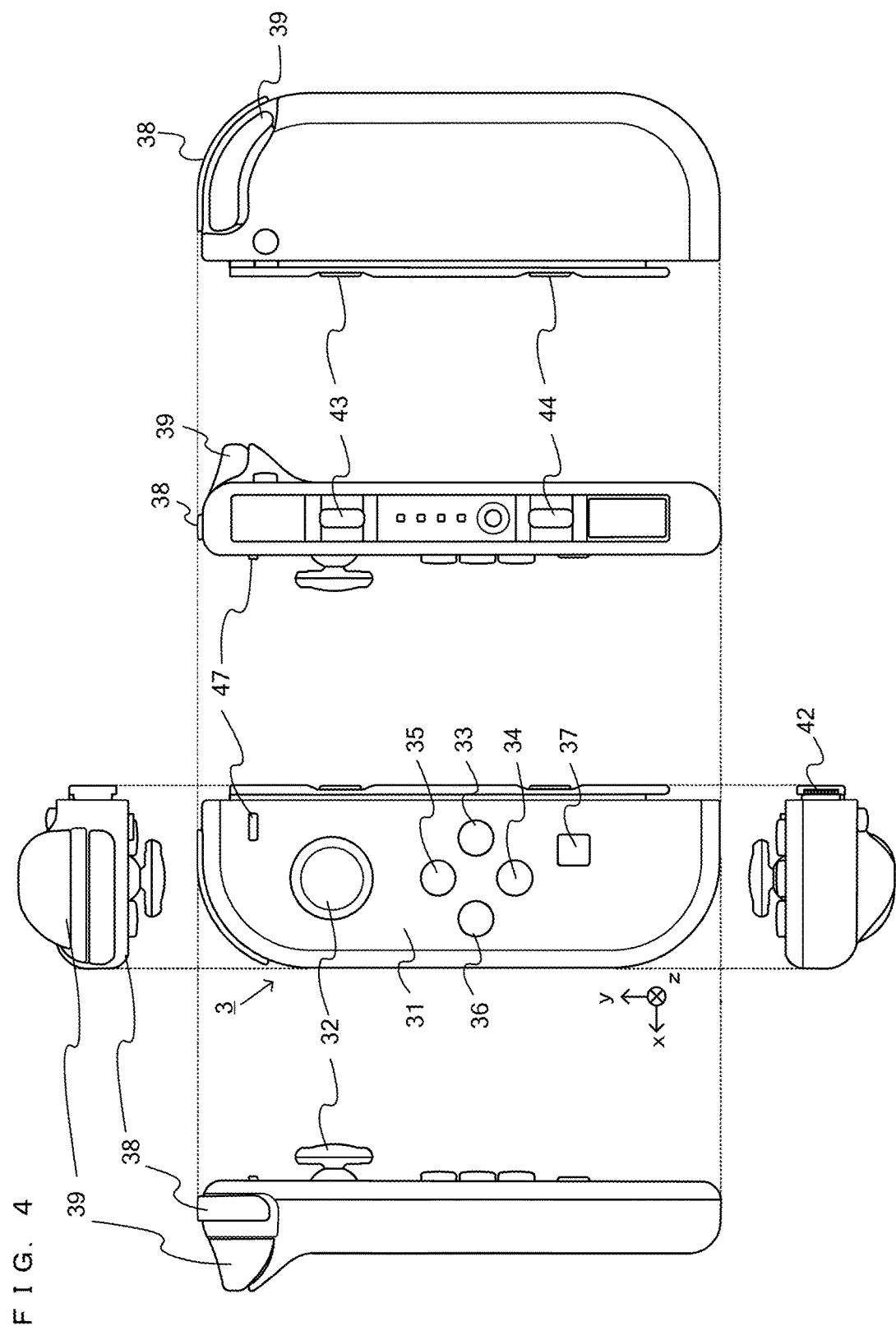
FIG. 4 is example non-limiting six orthogonal views showing an example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIG. 1). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that a cross key, a slide stick that allows a slide input, or the like may be provided as the direction input section, instead of the analog stick. Further, in the exemplary embodiment, it is possible to provide an input by pressing the analog stick.

The left controller 3 includes various operation buttons. Initially, the left controller 3 includes four operation buttons 33 to 36 (specifically, a right direction button 33, a down direction button 34, an up direction button 35, and a left direction button 36) on the main surface of the housing 31. Further, a record button 37 and a "−" (minus) button 47 are provided. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
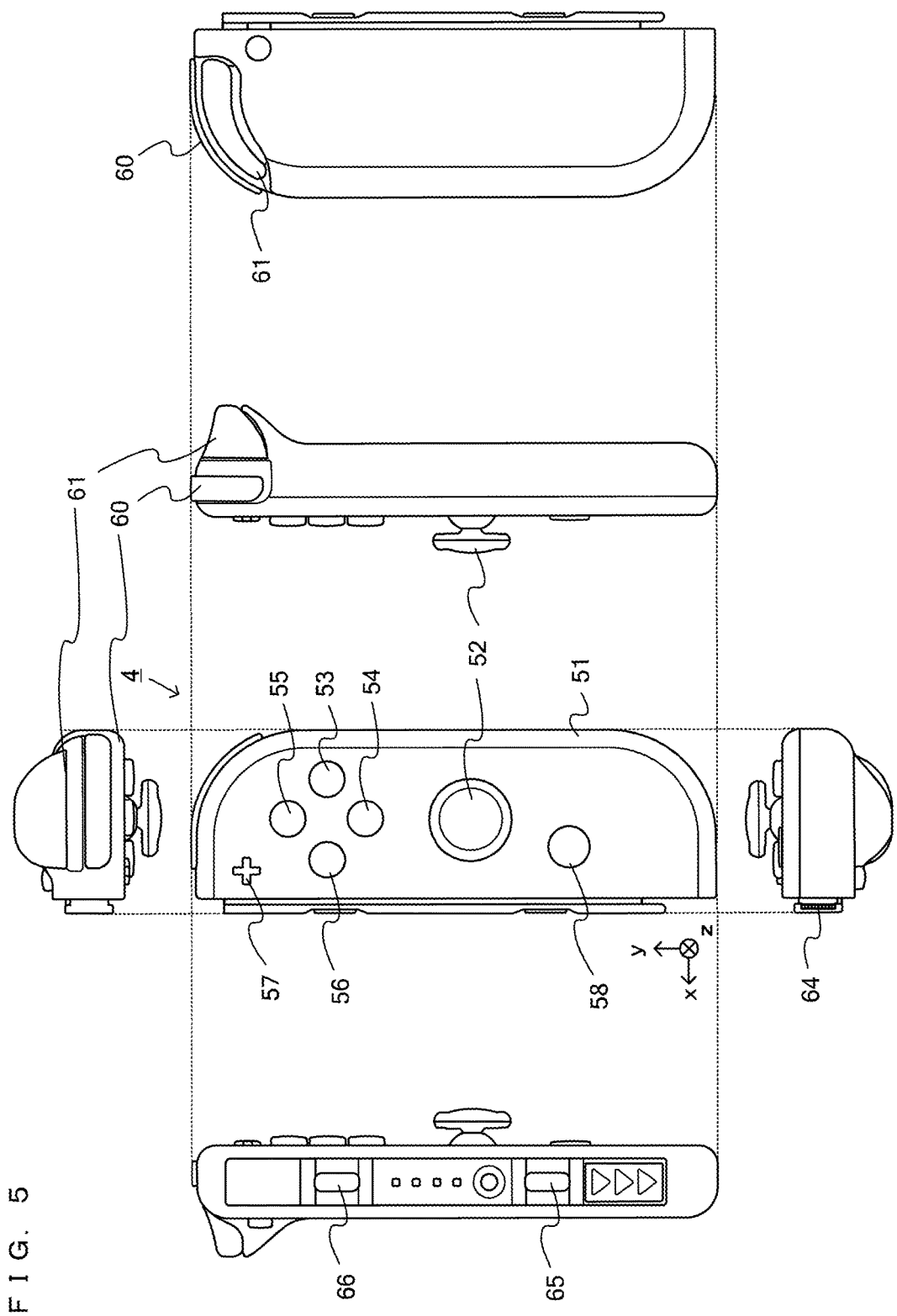
FIG. 5 is example non-limiting six orthogonal views showing an example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, a cross key, a slide stick that allows a slide input, or the like may be provided instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, a "+" (plus) button 57 and a home button 58 are provided. Further, the right controller 4 includes a first R-button 60 and a ZR-button 61 in an upper right portion of a side surface of the housing 51. Further, similarly to the left controller 3, a second L-button 65 and a second R-button 66 are provided.

Further, the right controller 4 includes a terminal 64 for the right controller 4 to perform wired communication with the main body apparatus 2.

Figure 6:
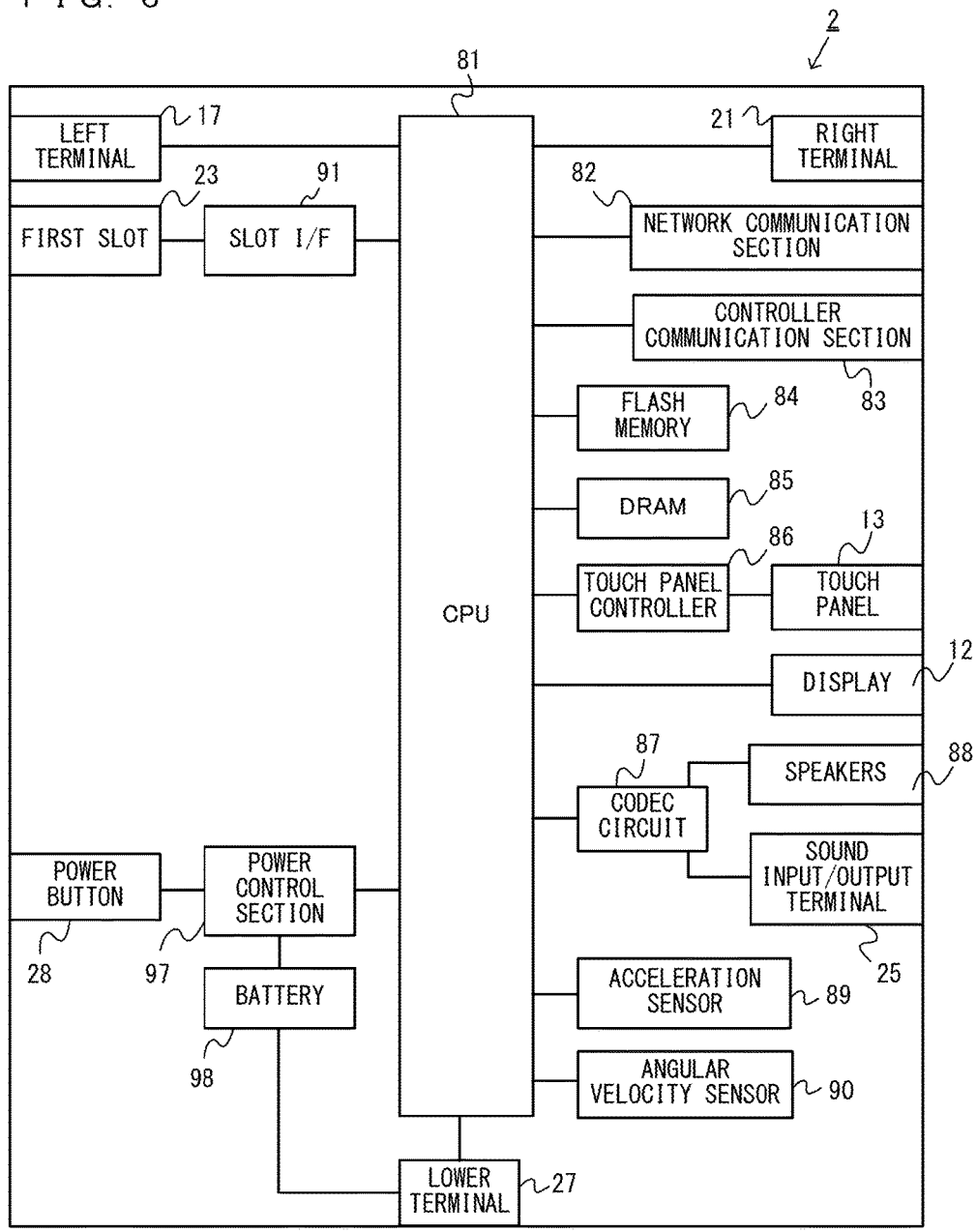
FIG. 6 is an example non-limiting block diagram showing an example of an internal configuration of the main body apparatus 2.

FIG. 6 is a block diagram showing an example of the internal configuration of the main body apparatus 2. The main body apparatus 2 includes components 81 to 98 shown in FIG. 6 in addition to the components shown in FIG. 3. Some of the components 81 to 98 may be mounted as electronic components on an electronic circuit board and accommodated in the housing 11.

The main body apparatus 2 includes a CPU (central processing unit) 81. The CPU 81 is an information processing section for executing various types of information processing to be executed by the main body apparatus 2, and, strictly, is a SoC (system-on-a-chip) having a plurality of functions such as a CPU function and a GPU function. The CPU 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the CPU 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the CPU 81. The slot I/F 91 is connected to the first slot 23, and in accordance with an instruction from the CPU 81, reads and writes data from and to the first type of storage medium (e.g., a dedicated memory card) attached to the first slot 23.

The CPU 81 appropriately reads and writes data from and to the flash memory 84, the DRAM 85, and each of the above storage media, thereby performing the above information processing.

The main body apparatus 2 includes a network communication section 82. The network communication section 82 is connected to the CPU 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the CPU 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The CPU 81 is connected to the left terminal 17, the right terminal 21, and the lower terminal 27. When performing wired communication with the left controller 3, the CPU 81 transmits data to the left controller 3 via the left terminal 17 and also receives operation data from the left controller 3 via the left terminal 17. Further, when performing wired communication with the right controller 4, the CPU 81 transmits data to the right controller 4 via the right terminal 21 and also receives operation data from the right controller 4 via the right terminal 21. Further, when communicating with the cradle, the CPU 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a user can provide inputs to the main body apparatus 2 by using the plurality of left controllers 3 and the plurality of right controllers 4.

The main body apparatus 2 includes a touch panel controller 86, which is a circuit for controlling the touch panel 13. The touch panel controller 86 is connected between the touch panel 13 and the CPU 81. Based on a signal from the touch panel 13, the touch panel controller 86 generates, for example, data indicating the position where a touch input is provided. Then, the touch panel controller 86 outputs the data to the CPU 81.

Further, the display 12 is connected to the CPU 81. The CPU 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the CPU 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the CPU 81, and the detection results of the acceleration sensor 89 and the angular velocity sensor 90 are output to the CPU 81. Based on the detection results of the acceleration sensor 89 and the angular velocity sensor 90, the CPU 81 can calculate information regarding the motion and/or the orientation of the main body apparatus 2.

The main body apparatus 2 includes a power control section 97 and a battery 98. The power control section 97 is connected to the battery 98 and the CPU 81. Further, although not shown in FIG. 6, the power control section 97 is connected to components of the main body apparatus 2 (specifically, components that receive power supplied from the battery 98, the left terminal 17, and the right terminal 21). Based on a command from the CPU 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
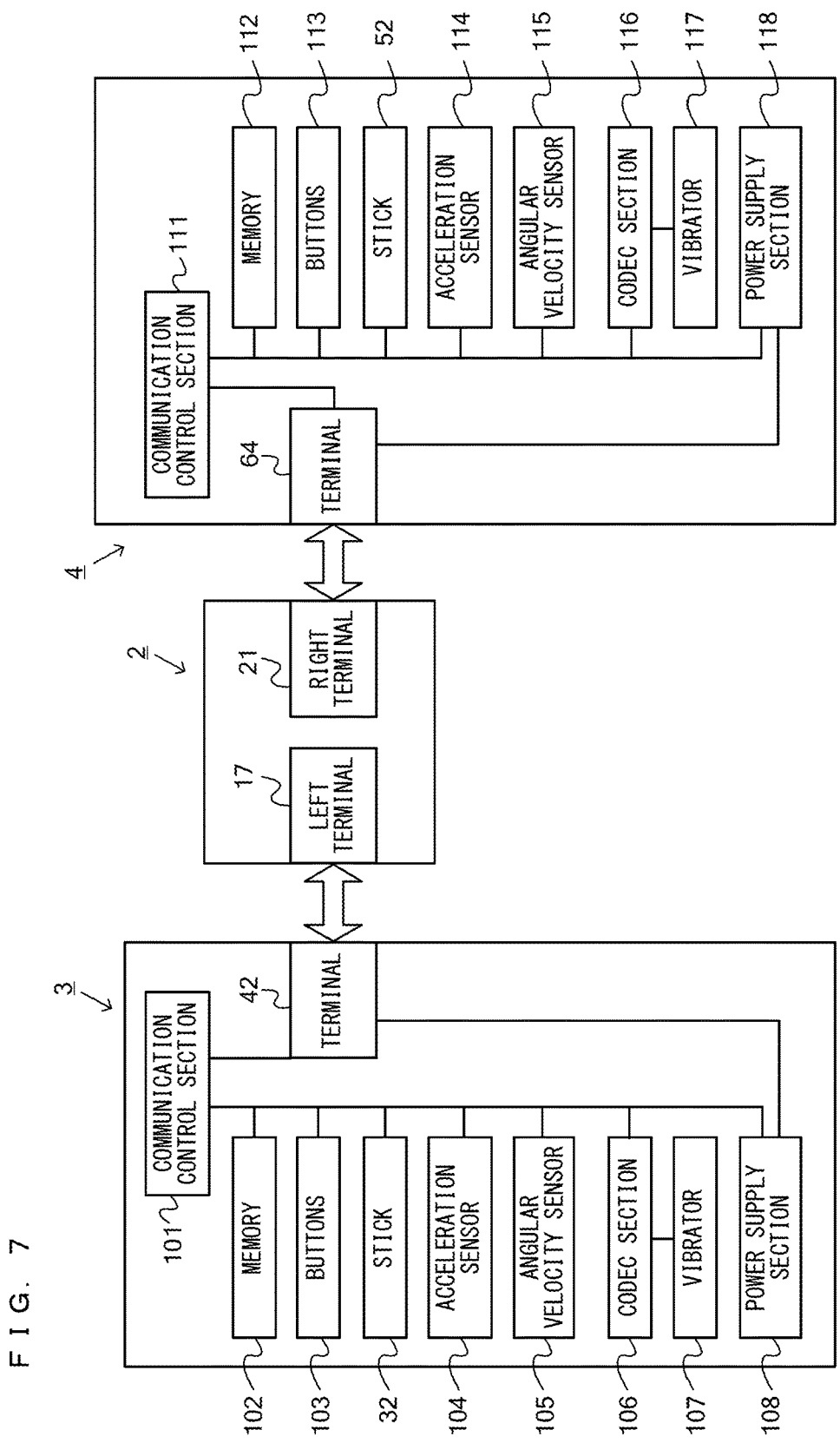
FIG. 7 is an example non-limiting block diagram showing examples of internal configurations of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, 46, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, an acceleration sensor 104 is provided. Further, an angular velocity sensor 105 is provided. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation, or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, information indicating the waveform itself may be transmitted. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 includes a power supply section 118. The power supply section 118 has a function similar to that of the power supply section 108 of the left controller 3 and operates similarly to the power supply section 108.

(Outline of Vibration Control in Game of Exemplary Embodiment)

Next, a game performed by using the above-described main body apparatus 2 and the controllers will be described. In the exemplary embodiment, while a game is being performed, the vibrators 107, 117 provided in the left and right controllers 3, 4 vibrate. Hereinafter, vibration control of the exemplary embodiment will be described.

FIG. 8 is an example non-limiting functional block diagram illustrating vibration control performed by the information processing system 1 of the exemplary embodiment.

As shown in FIG. 8, the main body apparatus 2 includes an orientation/motion calculation section 120, a movement calculation section 121, a waveform generation section 122, and a waveform output section 123. Each of the sections 120 to 123 is implemented by the CPU 81 of the main body apparatus 2 executing a predetermined game program (for example, game program stored in the flash memory 84 or a storage medium mounted in the slot 23). Further, as described above, the left controller 3 includes the inertial sensor (specifically, the acceleration sensor 104 and the angular velocity sensor 105), and the right controller 4 includes the inertial sensor (specifically, the acceleration sensor 114 and the angular velocity sensor 115).

The orientation/motion calculation section 120 calculates orientations and motions of the controllers, based on data from inertial sensors of the controllers (3, 4). Specifically, the orientation/motion calculation section 120 calculates an orientation (tilt) of the left controller 3, based on data form the angular velocity sensor 105 of the left controller 3. Further, the orientation/motion calculation section 120 calculates a motion (whether or not the left controller 3 is being swung, a swing vigorousness in the case of the left controller 3 being swung) of the left controller 3, based on data from the acceleration sensor 104 of the left controller 3. Similarly, the orientation/motion calculation section 120 calculates an orientation (tilt) and a motion of the right controller 4.

The movement calculation section 121 calculates movement of a virtual object. The movement calculation section 121 performs movement simulation for a virtual object, based on the orientation and/or the motion, of the controller, calculated by the orientation/motion calculation section 120, and calculates the movement (position, speed, acceleration, rotation, or the like) of the virtual object. The movement calculation section 121 performs the movement simulation for a virtual object in consideration of, for example, the mass of the virtual object, the size of the virtual object, force (gravitational force, inertial force, force, on the virtual object, other than the gravitational force, and the like) on the virtual object, and a friction between the virtual object and another object. In the exemplary embodiment, the movement calculation section 121 calculates, by assuming that the virtual object moves in a virtual container (virtual container object), the movement of the virtual object in the virtual container. In a case where a plurality of virtual objects are in the virtual container, the movement calculation section 121 calculates the movement for each virtual object.

The waveform generation section 122 generates a signal representing a vibration waveform based on a state of movement of a virtual object in the case of the virtual object contacting with another object or coming into contact with another object, based on the result of the movement of the virtual object being calculated by the movement calculation section 121. Specifically, in the main body apparatus 2, vibration pattern data representing vibration waveforms is previously stored, and the waveform generation section 122 generates a signal representing a vibration waveform, based on the vibration pattern data.

The "state of movement of a virtual object in the case of the virtual object contacting with another object" represents a state (speed, acceleration, rotation, and the like), of movement of a virtual object, obtained when a state where the virtual object is in contact with at least a part of another object, is maintained. Further, the "state of movement of a virtual object in the case of the virtual object coming into contact with another object" represents a state (speed, acceleration, rotation, and the like), of movement of a virtual object, obtained (at the moment) when the virtual object contacts with at least a part of another object.

The waveform generation section 122 generates a signal representing a vibration waveform based on the state of the movement of the virtual object. For example, when the virtual object rolls on the bottom surface of the virtual container, the waveform generation section 122 generates a signal representing a vibration waveform based on the rolling of the virtual object. When the virtual object collides with the surface of the virtual container, the waveform generation section 122 generates a signal representing a vibration waveform based on the collision of the virtual object. When a plurality of virtual objects exist, the waveform generation section 122 generates a signal representing a vibration waveform based on the state of movement of each virtual object. Therefore, the waveform generation section 122 may simultaneously generate a signal representing a vibration waveform based on the state of movement of a virtual object, and a signal representing a vibration waveform based on the state of movement of another virtual object (the two waveforms may have equal form or may have different forms). Further, even in a case where the number of the virtual objects is one, the waveform generation section 122 may simultaneously generate two or more signals representing vibration waveforms based on the state of movement of the one virtual object.

The waveform output section 123 outputs the signal, representing the vibration waveform, generated by the waveform generation section 122, to the controller. According thereto, the vibrators 107, 117 in the controllers vibrate. In a case where the waveform generation section 122 generates signals representing a plurality of vibration waveforms, the waveform output section 123 combines the plurality of vibration waveforms with each other, and outputs, to the controller, a signal representing a combined waveform obtained through the combination. For example, in a case where, when the waveform generation section 122 generates a signal representing a first vibration waveform, the waveform generation section 122 generates a signal representing a second vibration waveform, the waveform output section 123 combines the first vibration waveform and the second vibration waveform with each other, and outputs, to the controller, a signal representing the combined waveform. In a case where the waveform generation section 122 simultaneously generates three or more vibration waveforms, the three or more vibration waveforms are combined with each other, and a signal representing the combined waveform is output to the controller. The upper limit may be set for the number of the vibration waveforms which are combined by the waveform output section 123. For example, the waveform output section 123 may combine up to four vibration waveforms with each other.

When a signal representing one vibration waveform or a signal representing a combined waveform obtained by a plurality of vibration waveforms being combined with each other is output by the waveform output section 123, a vibrator of the controller vibrates according to the signal. The vibrator of the controller is structured such that, by a frequency and an amplitude being designated, the vibrator vibrates at the designated frequency and amplitude. The waveform output section 123 outputs a signal that includes the frequency and the amplitude of the vibration. The waveform output section 123 outputs the signal at predetermined time intervals (for example, every 5 m seconds). The vibrator of the controller vibrates at the frequency and the amplitude included in the signal. By the signal being output by the waveform output section 123 at the predetermined time intervals, the vibrator performs vibration corresponding to one vibration waveform or vibration corresponding to a combined waveform obtained by a plurality of vibration waveforms being combined with each other.

The orientation/motion calculation section 120, the movement calculation section 121, the waveform generation section 122, the waveform output section 123, the inertial sensor, and the vibrator, which are shown in FIG. 8, may be disposed in either the main body apparatus 2 or the controller. For example, the waveform generation section 122 and the waveform output section 123 may be disposed in the controller. In this case, vibration pattern data representing vibration waveforms may be previously stored in the controller. The main body apparatus 2 may output a signal (signal for designating vibration pattern data) representing the vibration waveform, according to the result of calculation by the movement calculation section 121, and the controller may read the vibration pattern data corresponding to the received signal, to vibrate the vibrator. Further, all of the orientation/motion calculation section 120, the movement calculation section 121, the waveform generation section 122, the waveform output section 123, the inertial sensor, and the vibrator may be provided in the main body apparatus 2, or may be provided in the controller.

Figure 9:
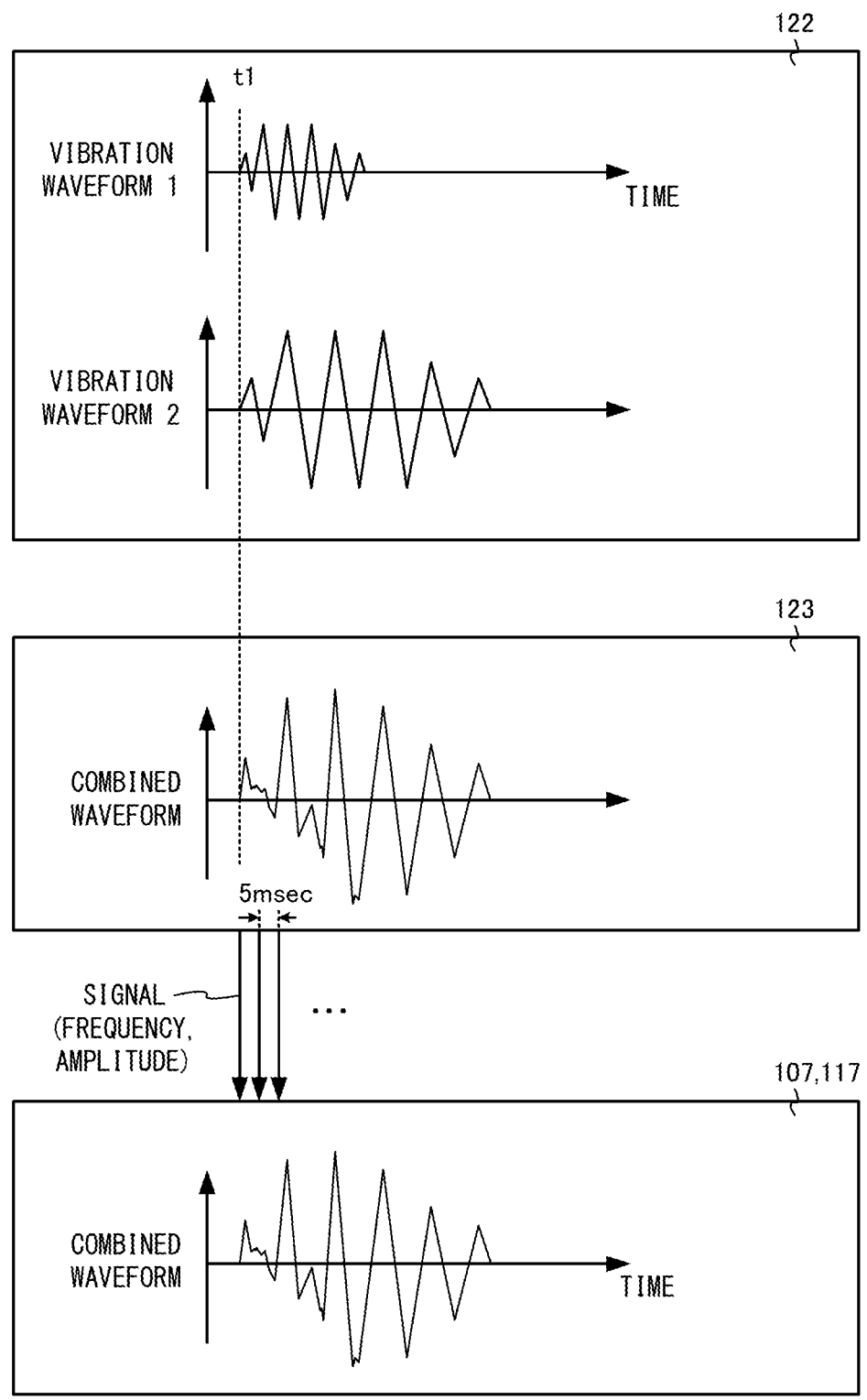
FIG. 9 is an example non-limiting diagram conceptually illustrating combination of two vibration waveforms in the case of the two vibration waveforms being simultaneously generated.

Combination of a plurality of vibration waveforms will be described. FIG. 9 is an example non-limiting diagram conceptually illustrating combination of two vibration waveforms in the case of the two vibration waveforms being simultaneously generated.

As shown in FIG. 9, the waveform generation section 122 generates, for example, a vibration waveform 1 according to a state of movement of a virtual object. The vibration based on the vibration waveform 1 is performed for a first predetermined time period. Further, the waveform generation section 122 generates, for example, a vibration waveform 2 according to a state of movement of the virtual object. The vibration based on the vibration waveform 2 is performed for a second predetermined time period that is different from or equal to the first predetermined time period. For example, the waveform generation section 122 may generate the vibration waveform 1 at a time t1, and simultaneously generate the vibration waveform 2. In this case, the waveform output section 123 outputs a signal representing a combined waveform obtained by the two vibration waveforms that are the vibration waveform 1 and the vibration waveform 2 being combined with each other. The vibrator 107, 117 in the controller vibrates based on the signal representing the combined waveform.

Specifically, the waveform output section 123 outputs, to the controller, a signal (frequency and amplitude) representing a vibration waveform, for example, every 5 m seconds. The vibrator 107, 117 vibrates at the frequency and the amplitude based on the signal from the waveform output section 123. Thus, the vibrator 107, 117 vibrates so as to correspond to the combined waveform.

A plurality of vibration waveforms may not necessarily be generated simultaneously. FIG. 10 is an example non-limiting diagram conceptually illustrating combining of two vibration waveforms in the case where, when vibration based on one vibration waveform occurs, a signal based on another vibration waveform is generated.

As shown in FIG. 10, the waveform generation section 122 generates, for example, the vibration waveform 1 at the time t1, and the waveform output section 123 outputs, to the controller, a signal representing the vibration waveform 1. Next, the waveform generation section 122 generates the vibration waveform 2 at a time t2 when a predetermined time has elapsed since the time t1. At the time t2, the vibration based on the vibration waveform 1 continues. In this case, the waveform output section 123 combines the vibration waveform 1 and the vibration waveform 2 with each other, and outputs, to the vibrator of the controller, a signal representing the combined waveform. Thus, vibration based on one vibration waveform, that is, the vibration waveform 1 is performed from the time t1 to the time t2, and vibration based on the combined waveform obtained by combination of the two vibration waveforms that are the vibration waveforms 1 and 2 is performed at and after the time t2.

Thus, in a case where, when a signal representing the first vibration waveform is output, a signal representing another vibration waveform that is the second vibration waveform is generated, the waveform output section 123 outputs a signal representing the combined waveform obtained by these vibration waveforms being combined with each other. Thus, the vibrator 107, 117 allows a vibration waveform to be changed while vibrating, in a case where, when the vibrator 107, 117 vibrates based on the first vibration waveform, another vibration waveform that is the second vibration waveform is generated.

Figure 11A:
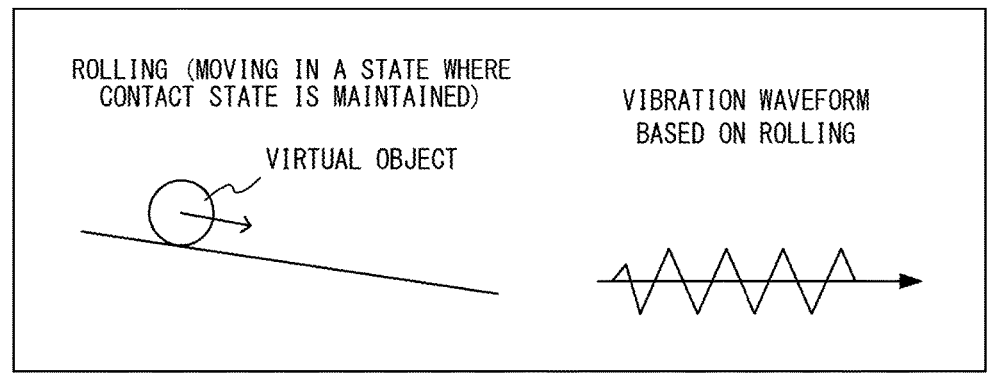
FIG. 11A is an example non-limiting diagram illustrating an example of a movement of a virtual object and vibration based on the movement.
Figure 11B:
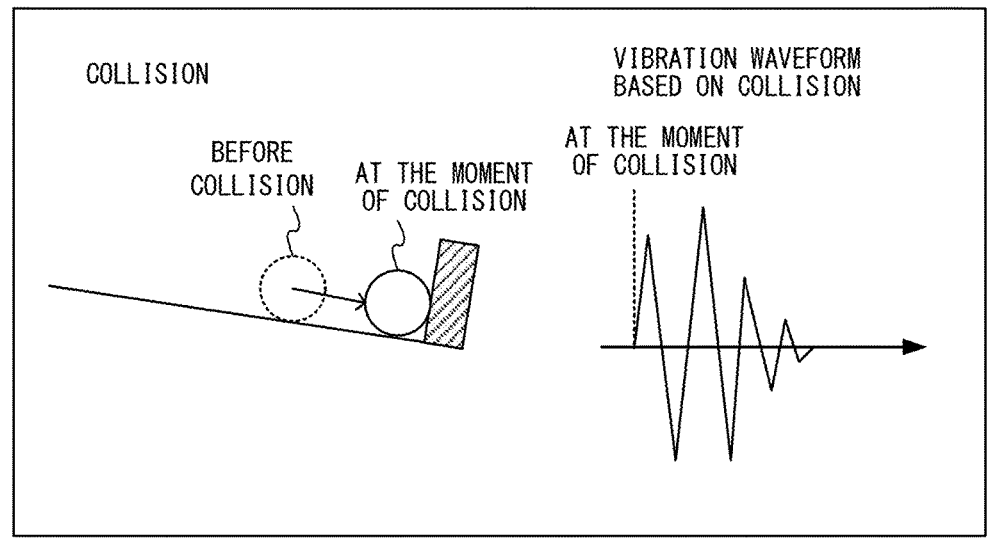
FIG. 11B is an example non-limiting diagram illustrating an example of a movement of a virtual object and vibration based on the movement.

Next, a movement of a virtual object and a vibration based on the movement will be described. FIG. 11A and FIG. 11B are each an example non-limiting diagram illustrating an example of a movement of a virtual object and vibration based on the movement.

As shown in FIG. 11A, in a case where, for example, a spherical virtual object rolls on a virtual flat surface, that is, in a case where the virtual object moves while the virtual object is in contact with the flat surface, a vibration waveform based on the rolling of the virtual object is generated. For example, in a case where the virtual object rolls on the flat surface, a vibration waveform having a relatively small amplitude is generated. While the virtual object is rolling on the flat surface, a vibration waveform based on the rolling is continuously generated.

Further, as shown in FIG. 11B, in a case where the virtual object collides with a virtual wall (side surface), that is, in a case where the virtual object contacts with the wall, a vibration waveform based on the collision of the virtual object is generated. For example, in a case where a virtual object collides with another object, a vibration waveform having a relatively great amplitude is generated. In a case where the virtual object collides, a vibration waveform based on the collision is generated for a predetermined time period from the moment of the collision.

In the exemplary embodiment, vibration waveforms based on states of movement of a virtual object are previously prepared. A vibration waveform based on a state of movement of a virtual object is selected according to a result of a movement simulation for the virtual object, and a signal representing the selected vibration waveform is generated. The vibration waveforms based on the states of movement of a virtual object as shown in FIG. 11A and FIG. 11B are merely examples, and another vibration waveform may be prepared. For example, different vibration waveforms may be prepared according to a speed, rotation, a type, a shape, a weight, hardness, a state of a surface, and the like of the virtual object. For example, in a case where the speed of the virtual object is high, a frequency of the vibration may be higher as compared to a case where the speed is low. Further, in a case where the virtual object is heavy, a frequency of the vibration may be lower as compared to a case where the virtual object is lightweight. Moreover, in a case where the surface of the virtual object is smooth (is not uneven), a frequency of the vibration may be lower and the amplitude thereof may be smaller as compared to a case where the surface is not smooth (is uneven). Furthermore, different vibration waveforms may be prepared according to the shape, hardness, the state of the surface, and the like of another object (flat surface, wall, another virtual object, or the like) that contacts with the virtual object.

(Specific Example of Game)

Next, a specific example of a game using the above-described vibration control will be described. Three games of a first game to a third game will be described below.

(First Game)

FIG. 12 is an example non-limiting diagram illustrating a state where the first game is performed. The first game is played by two players. One of the players holds the left controller 3, and the other of the players holds the right controller 4, and the game is played. As shown in FIG. 12, a game image is displayed on a screen of the main body apparatus 2. In the first game, the controller is regarded as a rectangular-parallelepiped-shaped box, and the number of balls that are virtually in the rectangular-parallelepiped-shaped box is guessed. The ball is the virtual object, and the rectangular-parallelepiped-shaped box is the virtual container. The main body apparatus 2 performs movement simulation for the ball object as the virtual object, and vibrates the controllers 3, 4 according to a result of the movement simulation for the ball object. Each player holds the controller and tilts or swings the controller, to vibrate the controller, and each player guesses the number of the balls in the box according to the vibration.

FIG. 13 is an example non-limiting diagram illustrating examples of the virtual object and the virtual container in the first game. As shown in FIG. 13, in the first game, the virtual containers (73, 74) are defined in a virtual space, and a plurality of ball objects 70 (for example, 70a to 70c) are contained in each virtual container. The virtual container 73 corresponds to the left controller 3, and the plurality of ball objects 70 are disposed in the virtual container 73. Meanwhile, the virtual container 74 corresponds to the right controller 4, and the plurality of ball objects 70 are disposed in the virtual container 74. The number of the ball objects 70 in the virtual container is determined at random when the game is started. The number of the ball objects in the virtual container 73 corresponding to the left controller 3 and the number of the ball objects in the virtual container 74 corresponding to the right controller 4 are equal to each other.

An XYZ-coordinate system shown in FIG. 13 is a coordinate system fixed for the virtual space, and an XbYbZb coordinate system is a coordinate system fixed for the virtual container.

Specifically, in the XYZ coordinate system, the Y-axis represents an axis in the height direction of the virtual space, the X-axis represents an axis in the lateral direction of the virtual space, and the Z-axis represents an axis in the depth direction of the virtual space. The virtual gravitational force is constantly applied in the Y-axis negative direction of the virtual space.

Further, the lateral direction of the virtual container is defined as the Xb-axis direction, the depth direction thereof is defined as the Zb-axis direction, and the height direction thereof is defined as the Yb-axis direction. The virtual container is shaped in a rectangular parallelepiped that is elongated in the lateral direction, and has the bottom surface (the surface parallel to the Xb-axis and the Zb-axis), and the side surfaces (surfaces parallel to the Yb-axis).

The orientation of the virtual container is in accordance with the orientation of the controller in a real space. For example, the longitudinal direction (y-axis direction in FIG. 12) of the left controller 3 conforms to the Xb-axis negative direction of the virtual container 73 corresponding to the left controller 3. The thickness direction (z-axis direction in FIG. 12) of the left controller 3 conforms to the Yb-axis negative direction of the virtual container 73. The width direction (x-axis direction in FIG. 12) of the left controller 3 conforms to the Zb-axis negative direction of the virtual container 73. The same applies to the virtual container 74 corresponding to the right controller 4, and the orientation of the virtual container 74 corresponding to the right controller 4 is in accordance with the orientation of the right controller 4 in the real space.

Figure 14A:
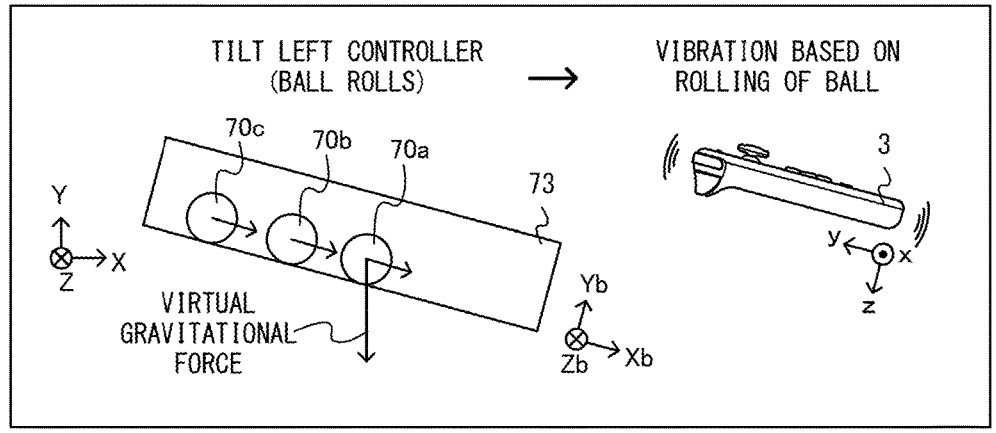
FIG. 14A is an example non-limiting diagram illustrating a state where a ball object 70 moves when the left controller 3 is tilted in a real space.
Figure 14B:
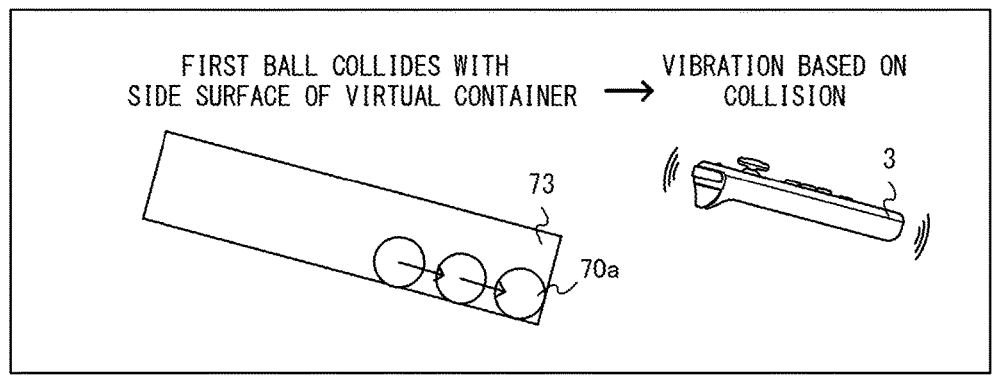
FIG. 14B is an example non-limiting diagram illustrating a state where the ball object 70 moves when the left controller 3 is tilted in a real space.
Figure 14C:
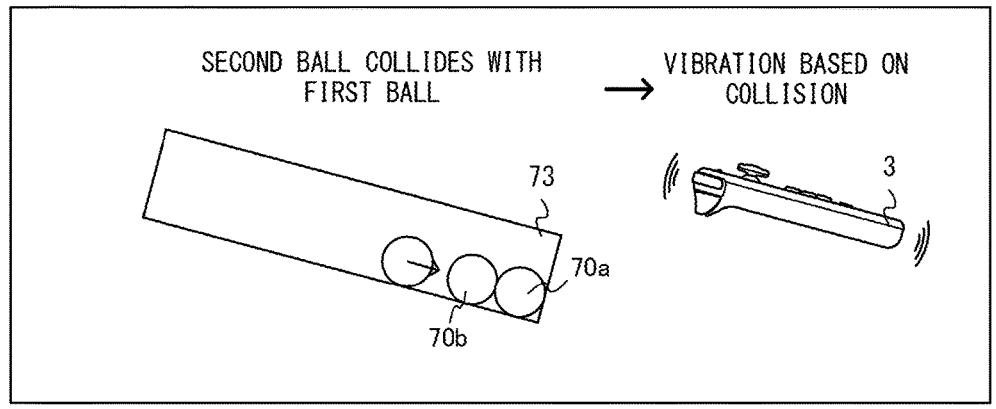
FIG. 14C is an example non-limiting diagram illustrating a state where the ball object 70 moves when the left controller 3 is tilted in a real space.

Movements of the virtual container 73 and the ball objects 70 in the case of the left controller 3 being tiled will be described by using the left controller 3 as an example. FIG. 14A to FIG. 14C are each an example non-limiting diagram illustrating a state where the ball object 70 moves when the left controller 3 is tilted in a real space.

As shown in FIG. 14A, in a case where the left controller 3 is rotated around, for example, the x-axis, the virtual container 73 corresponding to the left controller 3 also rotates around the Zb-axis, and the bottom surface of the virtual container 73 is tilted relative to the left-right direction in FIG. 14A. Since the virtual gravitational force is applied in the Y-axis negative direction fixed for the virtual space, a force in the direction (right direction in FIG. 14) along the bottom surface of the virtual container 73 is applied to the ball objects 70a to 70c in the virtual container 73. Due to the force, the ball objects 70a to 70c roll in the Xb-axis direction.

Specifically, the movement simulation is performed for the ball objects 70a to 70c, and positions, speeds, accelerations, rotations, and the like of the ball objects 70a to 70c are calculated. While the ball objects 70a to 70c are rolling on the bottom surface of the virtual container 73, the left controller 3 vibrates. More specifically, as described above, a signal representing a vibration waveform based on the rolling of the ball is generated for each of the ball objects 70a to 70c. The vibration waveforms based on the rolling of the ball objects 70a to 70c are combined with each other. That is, the vibration waveform based on the rolling of the ball object 70a, the vibration waveform based on the rolling of the ball object 70b, and the vibration waveform based on the rolling of the ball object 70c are combined with each other. Then, a signal based on the combined waveform obtained by the three vibration waveforms being combined with each other is output from the main body apparatus 2 to the left controller 3, and the vibrator 107 of the left controller 3 vibrates, so that the left controller 3 vibrates. The signal output by the main body apparatus 2 includes a frequency and an amplitude of the vibration. The vibrator 107 vibrates at the frequency and the amplitude included in the input signal.

As shown in FIG. 14B, when a predetermined time has elapsed since start of the rolling of the ball objects 70a to 70c in the virtual container 73, the ball object 70a at the right end collides with the side surface (surface parallel to the YbZb plane) of the virtual container 73. According to the collision of the ball object 70a, a signal representing a vibration waveform based on the collision is generated, and the vibrator 107 of the left controller 3 vibrates. Specifically, at a time when the ball object 70a collides with the side surface of the virtual container 73, the ball objects 70b and 70c are rolling on the bottom surface of the virtual container 73, and, therefore, the vibration waveform based on the collision of the ball object 70a, the vibration waveform based on rolling of the ball object 70b, and the vibration waveform based on rolling of the ball object 70c are combined with each other. The signal based on the combined waveform obtained through the combination is output to the left controller 3, and the vibrator 107 of the left controller 3 vibrates. When the ball object 70a collides, a vibration waveform that is different from a vibration waveform generated when another ball object rolls is generated, and an amplitude of the vibration obtained when the ball object 70a collides, is greater than an amplitude of the vibration obtained when the other ball object rolls. Therefore, a player can recognize collision of the ball object 70a with the side surface of the virtual container 73.

When the time further elapses, the ball object 70b collides with the ball object 70a at the right end, as shown in FIG. 14C. An impact of the collision is transmitted to the side surface of the virtual container 73 through the ball object 70a at the right end, and a vibration waveform based on the collision of the ball object 70b is generated. Thus, vibration based on the collision of the ball object 70b is generated.

In the first game of the exemplary embodiment, vibration pattern data representing vibration waveforms based on states of movements of the ball object 70 are prepared. Specifically, vibration pattern data (vibration pattern data for rolling) representing a vibration waveform based on rolling of the ball object 70 and vibration pattern data (vibration pattern data for collision) representing a vibration waveform based on collision of the ball object 70 are previously prepared. A state of movement of each of the ball objects 70 (that is, whether the ball object 70 is rolling or the ball object 70 collides with another object) is determined based on the result of the movement simulation for each of the ball objects 70, and the vibration pattern data based on the determination result is selected.

In a case where any of a plurality of pieces of the vibration pattern data is selected, the amplitude of the vibration is adjusted. For example, in a case where the ball object 70 rolls in the virtual container, the amplitude is adjusted according to the rolling speed. For example, the higher the rolling speed is, the greater the amplitude is. For example, the vibration waveform represented by the vibration pattern data for rolling may be multiplied by a coefficient based on the rolling speed. In a case where, when the vibrator is vibrating based on the vibration pattern data for rolling, the speed of the ball object 70 is changed, the amplitude is changed. For example, in a case where, when the vibrator is vibrating based on the vibration pattern data, a speed at which the ball object 70 rolls is changed according to an operation on the controller, the amplitude may be changed. Thus, the operation performed on the controller is reflected on the movement of the ball object 70 in real time, and the vibration is changed in real time.

Further, similarly in a case where the ball object 70 collides, the amplitude is adjusted according to the state of movement of the ball object 70 at the collision. For example, the higher a speed at which the ball object 70 collides is, the greater the amplitude is. For example, the vibration waveform represented by the vibration pattern data for collision may be multiplied by a coefficient based on the speed at the collision.

Not only when the ball object 70 collides with the side surface of the virtual container, but also when the ball object 70 collides with the bottom surface of the virtual container, vibration based on the collision may be generated. Further, the virtual container has an upper surface (surface parallel to the bottom surface: the lid of the virtual container), and vibration based on collision of the virtual object 70 with the upper surface of the virtual container may be generated. Further, a case where, when the ball objects 70 collide with each other, no vibration is generated by the ball objects 70 colliding with each other, and vibration of the collision between the ball objects 70 is transmitted to the virtual container, thereby generating vibration, is described above. However, vibration may be generated by the ball objects 70 colliding with each other. In this case, the vibration waveform based on the ball objects 70 colliding with each other, and the vibration waveform based on the ball object 70 and the surface of the virtual container colliding with each other may be equal to each other, or may be different from each other.

A case where two pieces of the vibration pattern data are prepared is described above. However, three or more pieces of the vibration pattern data may be prepared. For example, the vibration pattern data for a case where the ball objects collide with each other, and the vibration pattern data for a case where the ball object and the side surface of the virtual container collide with each other may be separately prepared. Further, different pieces of the vibration pattern data may be prepared according to a speed at which the ball object rolls. Furthermore, the vibration pattern data having different amplitudes according to the size and the weight of the ball may be prepared.

Further, in addition to or instead of an amplitude, a frequency of the vibration may be adjusted according to a speed of the ball object 70. For example, the frequency may be adjusted such that the higher the speed of the ball object 70 is, the higher the frequency is or the lower the frequency is. For example, in a case where the vibration pattern data is selected from the plurality of pieces of the vibration pattern data, the frequency based on the selected vibration pattern data may be adjusted according to the speed of the ball object 70. Further, a plurality of pieces of the vibration pattern data having different frequencies are previously prepared, and the vibration pattern data may be selected from the plurality of pieces of the vibration pattern data, according to the speed of the ball object 70. Further, in a case where, for example, the speed of the ball object 70 is changed when the vibrator is vibrating according to certain vibration pattern data, the frequency of the vibration may be changed according to the speed.

Thus, a player tilts the virtual container 73 by tilting the left controller 3 in the left-right direction, and moves the ball object 70 in the virtual container 73. The player perceives the vibration based on the movement (rolling, collision) of the ball object 70, whereby the player can guess the number of the ball objects 70 in the virtual container 73.

The same applies to the right controller 4. The virtual container 74 corresponding to the right controller 4 is defined in a virtual space, and one or more ball objects 70 are contained in the virtual container 74. A player tilts the virtual container 74 by tilting the right controller 4 in the left-right direction, and moves the ball objects 70 in the virtual container 73. The player guesses the number of the ball objects 70 in the virtual container 73 according to the vibration based on the movement of the ball objects 70. Each player gives an answer about the number of the ball objects contained in the virtual container 73, and a player whose answer is correct wins. In another example, instead of two players competing in the first game, one player may guess the number of virtual balls in the game.

(Second Game)

Next, a second game will be described. FIG. 15 is an example non-limiting diagram illustrating a state where the second game is performed. Also in the second game, two players play the game, and one of the players holds the left controller 3 and the other of the players holds the right controller 4, to play the game. In the second game, the controller is regarded as a dice cup, two dices in the dice cup are thrown, and the two players compete for the magnitude of the total of dice pips. The dice is an example of the virtual object, and the dice cup is an example of the virtual container. The main body apparatus 2 performs movement simulation for the dice object as the virtual object, and vibrates the controllers 3, 4 according to the result of the movement simulation for the dice object. In another example, in a game played by one player, similar vibration may be caused in performance for throwing the dices.

Figure 16:
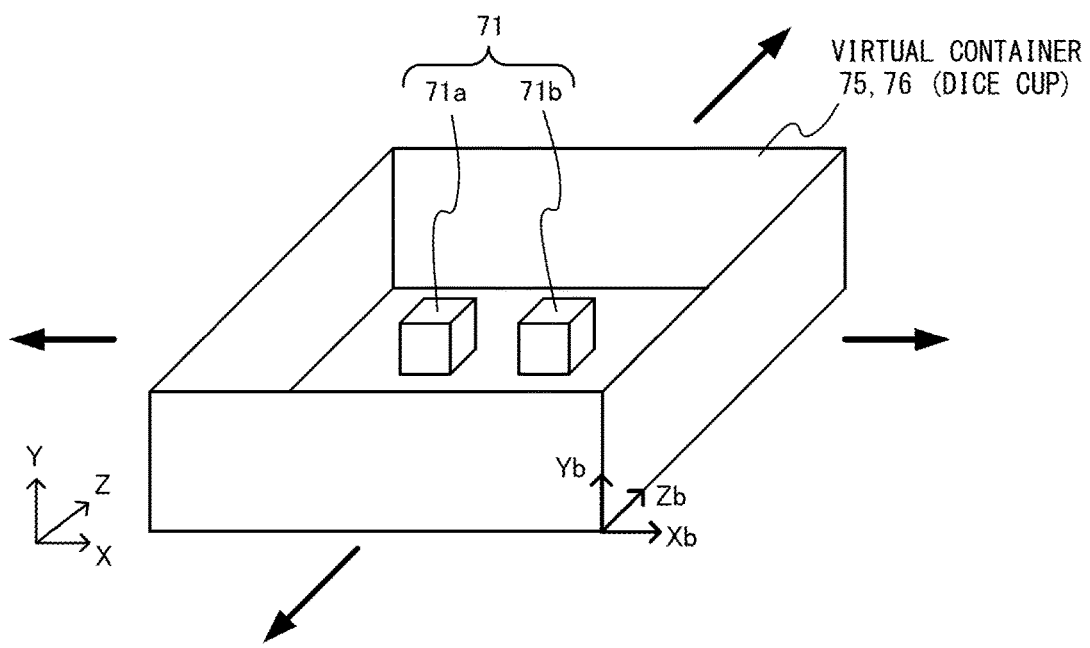
FIG. 16 is an example non-limiting diagram illustrating examples of a virtual object and a virtual container in the second game.

FIG. 16 is an example non-limiting diagram illustrating examples of the virtual object and the virtual container in the second game. As shown in FIG. 16, in the second game, virtual containers 75, 76 (dice cups) are defined in the virtual space, and two dice objects 71 (71a, 71b) are contained in each virtual container. The dice objects 71a, 71b and the virtual container 75 corresponding to the left controller 3 are defined, and the dice objects 71a, 71b and the virtual container 76 corresponding to the right controller 4 are defined. In the exemplary embodiment, the virtual containers 75, 76 are each shaped in a rectangular parallelepiped. However, the virtual containers 75, 76 may be, for example, cup-shaped. Further, the dice object 71 is shaped in a cube.

Also in the second game, similarly to the first game, the XbYbZb coordinate system is fixed for each of the virtual containers 75, 76. The orientation of the virtual container 75 is in accordance with the orientation of the left controller 3 in a real space, and the orientation of the virtual container 76 is in accordance with the orientation of the right controller 4 in a real space.

Figure 17A:
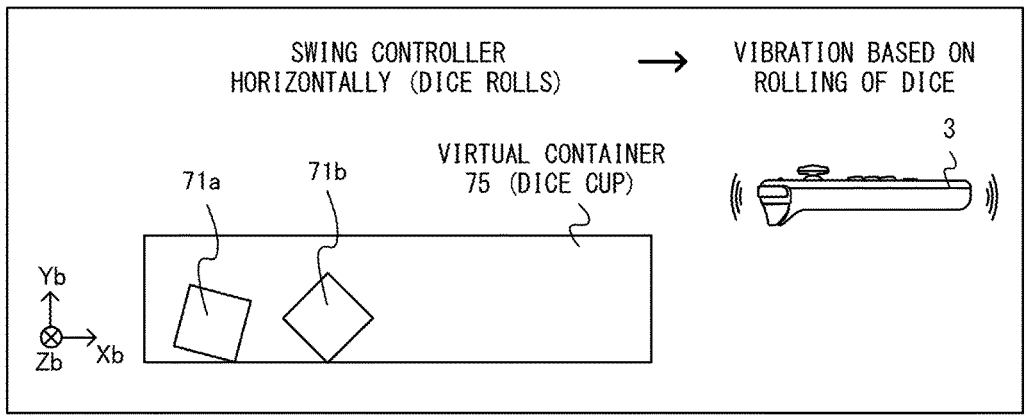
FIG. 17A is an example non-limiting diagram illustrating a state where dice objects 71a, 71b move when the left controller 3 is horizontally swung in a real space.
Figure 17B:
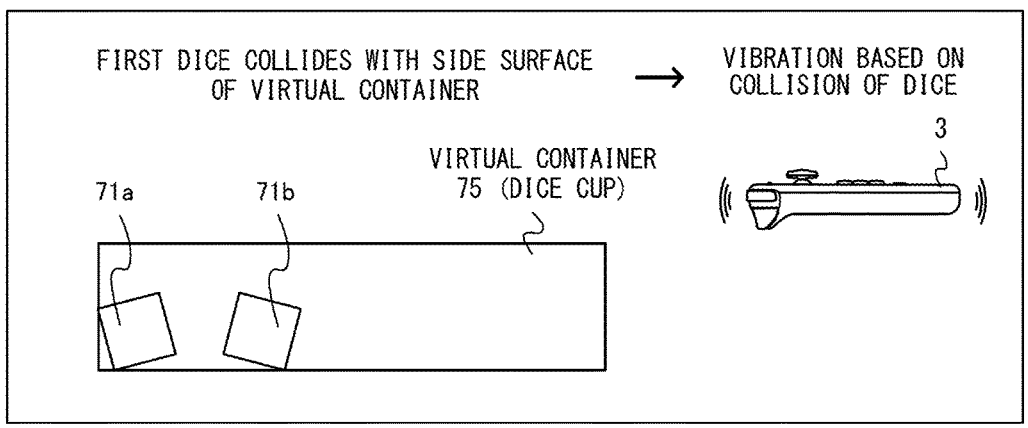
FIG. 17B is an example non-limiting diagram illustrating a state where the dice objects 71a, 71b move when the left controller 3 is horizontally swung in a real space.

Movements, of the virtual container 75 and the dice objects 71a, 71b, obtained when the left controller 3 is horizontally swung and horizontally tilted will be described below by using the left controller 3 as an example. FIG. 17A and FIG. 17B are each an example non-limiting diagram illustrating a state where the dice objects 71a, 71b move when the left controller 3 is horizontally swung in a real space.

As shown FIG. 17A, in a case where the left controller 3 is swung horizontally (in the x-axis direction or the y-axis direction), the virtual container 75 corresponding to the left controller 3 is also horizontally moved. Whether or not the left controller 3 is swung is determined according to a value of an acceleration detected by the acceleration sensor 104 provided in the left controller 3. When the virtual container 75 is horizontally moved, the dice objects 71a, 71b in the virtual container 75 roll in the virtual container 75. When the left controller 3 is horizontally tilted, the virtual container 75 is also horizontally tilted. The virtual gravitational force is applied in the Y-axis negative direction fixed in the virtual space, whereby a force in the direction (the left-right direction in FIG. 17A) along the bottom surface of the virtual container 75 is applied to the dice objects 71a, 71b in the virtual container 75. Due to the force, the dice objects 71a, 71b roll in the Xb-axis direction.

Specifically, movement simulation is performed for each of the dice objects 71a, 71b, and the positions, the speeds, the accelerations, the rotations, and the like of the dice objects 71a, 71b are calculated. While the dice objects 71a, 71b are rolling on the bottom surface of the virtual container 75, the left controller 3 vibrates. More specifically, a signal representing a vibration waveform based on rolling of the dice object is generated for each of the dice objects 71a, 71b. The vibration waveforms based on the rollings of the dice objects 71a, 71b are combined with each other. That is, the vibration waveform based on the rolling of the dice object 71a and the vibration waveform based on the rolling of the dice object 71b are combined with each other. A signal based on the combined waveform obtained through the combination is output from the main body apparatus 2 to the left controller 3, and the vibrator 107 of the left controller 3 vibrates, to vibrate the left controller 3.

As shown in FIG. 17B, by the dice objects 71a, 71b rolling, for example, leftward in the virtual container 75, the dice object 71a collides with the side surface (surface parallel to the YbZb plane) of the virtual container 75. According to the collision of the dice object 71a, a signal representing a vibration waveform based on the collision is generated, and the vibrator 107 of the left controller 3 vibrates.

Each time each of the dice objects 71a, 71b rolls in the virtual container 75, a vibration waveform based on the rolling is generated. Further, each time each of the dice objects 71a, 71b collides with the side surface of the virtual container 75, a vibration waveform based on the collision is generated. The vibration waveforms are combined with each other. A signal representing the combined waveform obtained through the combination is output to the left controller 3, and the vibrator 107 of the left controller 3 vibrates, to vibrate the left controller 3. Thus, a player is allowed to perceive such a vibration that the player actually swings an actual dice cup.

A vibration waveform generated is different between a case where the dice object 71 rolls in the virtual container 75, and a case where the dice object 71 collides with the side surface of the virtual container 75. That is, the vibration pattern data for a case where the dice object 71 rolls in the virtual container 75, and the vibration pattern data for a case where the dice object 71 collides with the side surface of the virtual container 75 are separately prepared. The vibration waveform generated may be the same between a case where the dice object 71 rolls in the virtual container 75 and a case where the dice object 72 collides with the side surface of the virtual container 75. That is, the vibration pattern data for a case where the dice object 71 rolls in the virtual container 75, and the vibration pattern data for a case where the dice object 71 collides with the side surface of the virtual container 75 may be the same. Further, three or more pieces of the vibration pattern data representing vibration waveforms based on the states of movements of the dice object 71 may be prepared. For example, the vibration pattern data for a case where the dice objects 71 collide with each other, and the vibration pattern data for a case where the dice object 71 collides with the surface of the virtual container 75 may be separately prepared. Moreover, the vibration pattern data for a case where the dice object 71 slides on the bottom surface of the virtual container 75 (the dice object 71 is moved on the surface without rolling) may be separately prepared. Further, the vibration pattern data for a case where the dice object 71 rolls on the bottom surface of the virtual container 75, and the vibration pattern data for a case where the dice object 71 floating in the air collides with the bottom surface of the virtual container 75, may be separately prepared.

Further, similarly to the first game, also in the second game, the amplitude of the vibration may be adjusted according to the state of movement of the dice object 71. For example, in a case where the dice object 71 rolls in the virtual container, the amplitude may be adjusted according to the rolling speed. For example, the amplitude may be adjusted such that the higher the rolling speed is, the greater the amplitude is. Further, in a case where the dice object 71 collides with the side surface of the virtual container, the amplitude may be adjusted according to the speed at the collision. For example, the amplitude may be adjusted such that the higher the speed at the collision is, the greater the amplitude is.

Further, in addition to or instead of an amplitude, a frequency may be adjusted according to a speed at which the dice object 71 rolls. For example, the frequency may be adjusted such that the higher the speed of the dice object 71 is, the higher the frequency is or the lower the frequency is. Further, the frequency may be adjusted in consideration of rotation of the dice object 71 such that the higher the rotation speed is, the higher (or the lower) the frequency is.

(Third Game)

Next, a third game will be described. In the third game, a player uses the controller as a shaker, to tilt or swing the controller. Examples of the shaker include maracas. Vibration and sound are output according to the controller being tilted or swung. In the following description, a player plays the third game by using the left controller 3. The same applies to a case where the right controller 4 is used.

Figure 18:
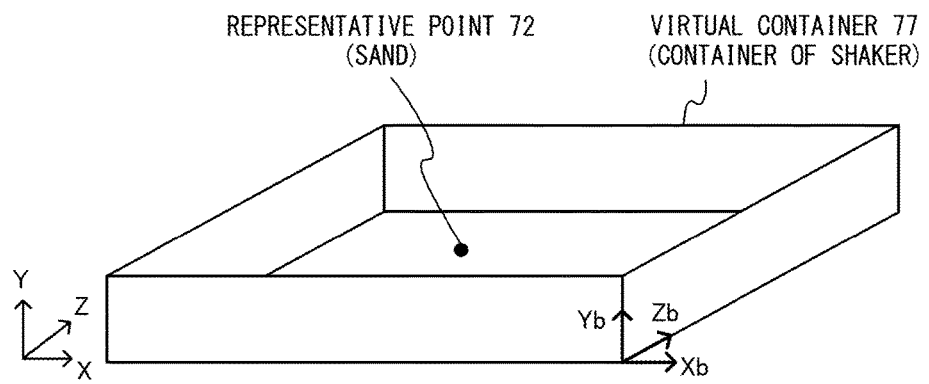
FIG. 18 is an example non-limiting diagram illustrating examples of a virtual object and a virtual container in a third game.

FIG. 18 is an example non-limiting diagram illustrating examples of a virtual object and a virtual container in the third game. The shaker such as actual maracas is formed from a container and sand in the container. In the exemplary embodiment, in order to simulate vibration in the case of the shaker being swung or tilted, the container of the shaker is represented by a virtual container 77, and the sand in the container of the shaker is represented by one representative point.

As shown in FIG. 18, the virtual container 77 is defined in a virtual space, and a representative point 72 is contained in the virtual container 77. The virtual container 77 is shaped in, for example, a rectangular parallelepiped. The representative point 72 is, for example, a point or a grain having no dimensions. Similarly to the first game and the second game, the XYZ coordinate system is a coordinate system fixed for the virtual space, and the XbYbZb coordinate system is a coordinate system fixed for the virtual container 77.

When the orientation of the left controller 3 is changed in a real space, the orientation of the virtual container 77 is also changed in the virtual space. The representative point 72 is moved according to the orientation of the virtual container 77 being changed, and the left controller 3 vibrates according to the movement of the representative point 72. Further, by the left controller 3 being swung in the real space, the left controller 3 vibrates.

Figure 19A:
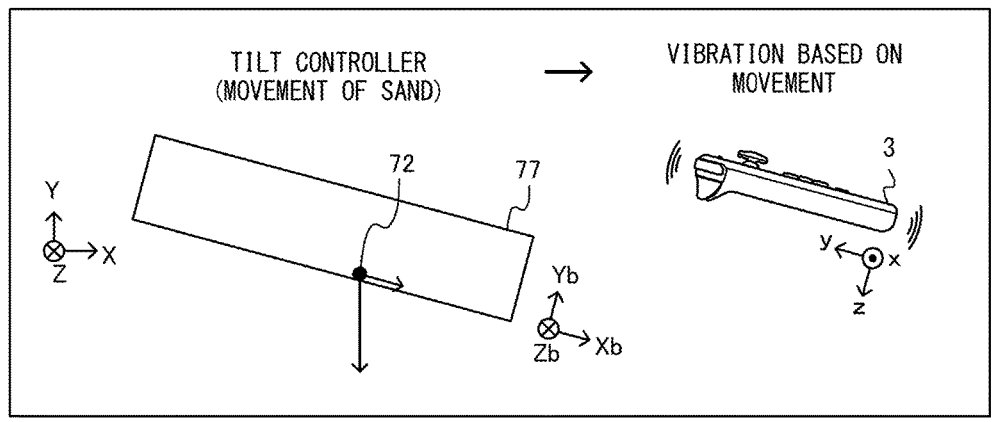
FIG. 19A is an example non-limiting diagram conceptually illustrating movement of a representative point 72 and vibration based on the movement in the case of an orientation of the left controller 3 being changed.
Figure 19B:
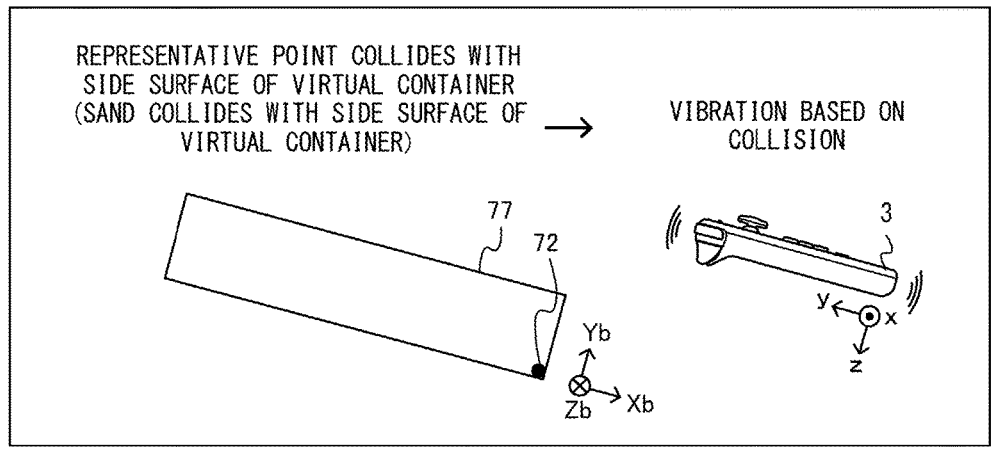
FIG. 19B is an example non-limiting diagram conceptually illustrating movement of the representative point 72 and vibration based on the movement in the case of an orientation of the left controller 3 being changed.
Figure 19C:
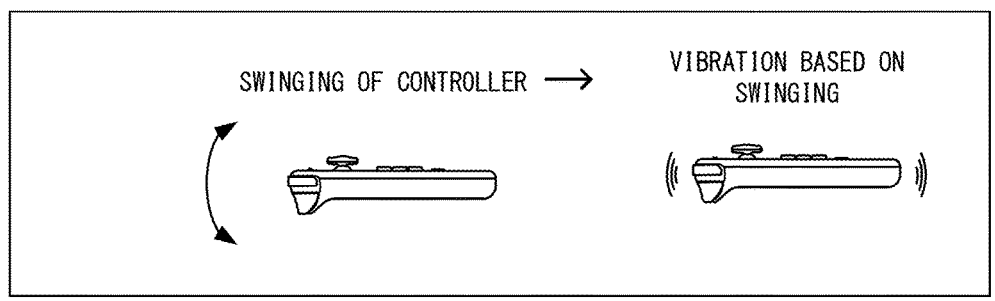
FIG. 19C is an example non-limiting diagram conceptually illustrating a state where the left controller 3 vibrates when the left controller 3 is swung.

FIG. 19A and FIG. 19B are each an example non-limiting diagram conceptually illustrating movement of the representative point 72 and vibration according thereto in the case of orientation of the left controller 3 being changed. FIG. 19C is an example non-limiting diagram conceptually illustrating a state where the left controller 3 vibrates when the left controller 3 is swung.

As shown in FIG. 19A, in a case where the left controller 3 is rotated, for example, around the x-axis, the virtual container 77 is also rotated around the Zb-axis, and the bottom surface of the virtual container 77 is tilted relative to the left-right direction in FIG. 19A. The virtual gravitational force is applied in the Y-axis negative direction fixed for the virtual space. Therefore, a force in the direction (right direction in FIG. 19A) along the bottom surface of the virtual container 77 is applied to the representative point 72 in the virtual container 77. Due to the force, the representative point 72 is moved in the Xb-axis direction. Specifically, movement simulation is performed for the representative point 72, and the position, the speed, the acceleration, and the like of the representative point 72 are calculated.

While the representative point 72 is moving on the bottom surface of the virtual container 77, the left controller 3 vibrates (FIG. 19A). Specifically, a signal representing a vibration waveform based on the movement of the representative point 72 is generated, and the signal is output from the main body apparatus 2 to the left controller 3, and the vibrator 107 of the left controller 3 vibrates. In the third game, a plurality of pieces of the vibration pattern data representing vibration waveforms based on the movement of the representative point 72 are prepared. Further, while the representative point 72 is moving on the bottom surface of the virtual container 77, such a sound that the sand in the shaker is moved when the shaker is tiled, is output from the speaker.

Further, in a case where the representative point 72 is moved in the virtual container 77 and collides with the side surface of the virtual container 77, the left controller 3 vibrates according to the collision (FIG. 19B). Specifically, a signal representing a vibration waveform based on the collision of the representative point 72 is generated, and the signal is output to the left controller 3, and the vibrator 107 of the left controller 3 vibrates. The vibration waveform based on the collision of the representative point 72 is different from the vibration waveform based on the movement of the representative point 72. In the third game, a plurality of pieces of the vibration pattern data representing vibration waveforms based on the collision of the representative point 72 are prepared. Further, when the representative point 72 collides with the side surface of the virtual container 77, such a sound that the sand collides with the inner surface of the container of the shaker is output from the speaker.

In the description herein, a vibration (FIG. 19A) generated by the representative point 72 being moved on the bottom surface of the virtual container 77, and a vibration (FIG. 19B) generated by collision of the representative point 72 may be generically called "vibration based on movement of the representative point".

Meanwhile, in a case where a player vigorously swings the left controller 3, the left controller 3 vibrates according to the vigorousness of the swinging (FIG. 19C). Specifically, when the left controller 3 is swung, the acceleration sensor 104 of the left controller 3 detects an acceleration. In a case where the value of the acceleration detected by the acceleration sensor 104 is greater than a predetermined threshold value, a signal representing a vibration waveform based on the swinging of the controller is generated, and output to the left controller 3, to vibrate the vibrator 107 of the left controller 3. The vibration waveform based on the swinging of the left controller 3 is different from the vibration waveform based on movement of the representative point 72 and the vibration waveform based on collision of the representative point 72. Further, an amplitude of the vibration based on swinging of the left controller 3 is greater than an amplitude of the vibration based on each of movement and collision of the representative point 72. Moreover, in the exemplary embodiment, a plurality of pieces of the vibration pattern data representing vibration waveforms based on swinging of the controller are prepared. In a case where the left controller 3 is swung, sound (sound generated when a player swings the shaker) is output from the speaker in a volume based on the vigorousness of the swinging.

In the description herein, the vibration, based on swinging of the controller, performed when the value of acceleration is greater than the predetermined threshold value may be referred to as "vibration based on the value of an acceleration".

Thus, in the third game, movement simulation is performed for the representative point 72 based on the orientation of the controller, and vibration (vibration based on the movement in FIG. 19A, vibration based on the collision in FIG. 19B) based on the movement of the representative point 72, is performed as a result of the movement simulation. Further, in a case where the controller is vigorously swung, the vibration (FIG. 19C) based on the value of the acceleration is performed.

FIG. 20 is an example non-limiting diagram illustrating an example of the vibration pattern data of the vibration based on the movement of the representative point in the third game. FIG. 21 is an example non-limiting diagram illustrating an example of the vibration pattern data of vibration based on the value of an acceleration in the third game.

As shown in FIG. 20, vibration patterns P1 to P3 are previously stored in the main body apparatus 2 as the vibration pattern data for a case where the representative point 72 is moving. When the representative point 72 is moving, any of the vibration patterns P1 to P3 is selected at random. The vibration patterns P1 to P3 are each a vibration pattern that allows the vibrator of the controller to perform vibration similar to vibration generated by the sand being moved (flowing) in the shaker when an actual shaker is tilted. The vibration patterns P1 to P3 represent different vibration waveforms, respectively.

Specifically, when movement of the representative point 72 on the bottom surface of the virtual container 77 is started, any of the vibration patterns P1 to P3 is selected at random. When any of the vibration patterns P1 to P3 is selected, a signal representing a vibration waveform based on the selected vibration pattern is generated. Thus, vibration based on the movement (movement of the sand) of the representative point 72 is performed. At this time, the amplitude of the vibration is adjusted. For example, the higher the moving speed of the representative point 72 is, the greater the amplitude is. The frequency may be adjusted according to the moving speed of the representative point 72. For example, the frequency may be adjusted such that the higher the speed of the representative point 72 is, the higher (or the lower) the frequency is.

While the representative point 72 is moving on the bottom surface of the virtual container 77, the vibration based on the selected vibration pattern is repeated. That is, from the start of the movement of the representative point 72 to the halt thereof, the vibration based on the same vibration pattern data is performed. In a case where, when the representative point 72 is moving, the speed of the representative point 72 is changed, the amplitude is changed according to the change of the speed. For example, when the speed is increased, the amplitude is increased. For example, when the representative point 72 halts by the representative point 72 colliding with the side surface of the virtual container 77, the vibration based on any of the vibration patterns P1 to P3 ends. When the movement of the representative point 72 on the bottom surface of the virtual container 77 is started again, any of the vibration patterns P1 to P3 is selected at random, and vibration is performed based on the selected vibration pattern.

Further, when the representative point 72 collides, any of vibration patterns P4 to P12 is selected. The vibration patterns P4 to P12 are each a vibration pattern that allows the vibrator of the controller to perform a vibration similar to a vibration generated by the sand in the shaker colliding with the inner surface of the container of the shaker when an actual shaker is tilted. The vibration patterns P4 to P12 represent different vibration waveforms, respectively. Specifically, the vibration patterns P4 to P12 are classified into three types according to the magnitude of the speed of the representative point at the collision. In a case where the speed of the representative point 72 at the collision is high, any of the vibration patterns P4 to P6 that are classified as "great" is selected at random. Further, in a case where the speed of the representative point 72 at the collision is a medium speed, any of the vibration patterns P7 to P9 that are classified as "medium" is selected at random. Moreover, in a case where the speed of the representative point 72 at the collision is low, any of the vibration patterns P10 to P12 that are classified as "small" is selected at random.

In a case where any of the vibration patterns P4 to P12 shown in FIG. 20 is selected, a signal representing a vibration waveform based on the selected vibration pattern is generated. Thus, vibration based on the collision (collision of the sand) of the representative point 72 is performed. At this time, the amplitude of the vibration is adjusted. For example, the higher the speed of the representative point 72 at the collision is, the greater the amplitude is. The frequency may be adjusted according to the speed of the representative point 72 at the collision. For example, the frequency may be adjusted such that the higher the speed of the representative point 72 at the collision is, the higher (or the lower) the frequency is.

As shown in FIG. 21, the vibration patterns P13 to P21 are previously stored in the main body apparatus 2 as vibration patterns of vibration based on the value of an acceleration. The vibration patterns P13 to P21 are each a vibration pattern that allows the vibrator of the controller to perform a vibration similar to a vibration generated by an actual shaker being swung. The vibration patterns P13 to P21 represent different vibration waveforms, respectively. Specifically, the vibration patterns P13 to P21 are classified into three types according to the magnitude of the value of the acceleration. In a case where the value of the acceleration is great, any of the vibration patterns P13 to P15 that are classified as "great" is selected at random. Further, in a case where the value of the acceleration is a medium value, any of the vibration patterns P16 to P18 that are classified as "medium" is selected at random. Moreover, in a case where the value of the acceleration is small, any of the vibration patterns P19 to P21 that are classified as "small" is selected at random.

In a case where any of the vibration patterns P13 to P21 shown in FIG. 21 is selected, a signal representing a vibration waveform based on the selected vibration pattern is generated. Thus, vibration (vibration based on swinging of the controller) based on the value of the acceleration is performed. At this time, the amplitude of vibration is adjusted. For example, the greater the value of the acceleration is, the greater the amplitude is. The frequency may be adjusted according to the value of the acceleration. For example, the frequency may be adjusted such that the greater the value of the acceleration is, the higher (or the lower) the frequency is.

When the controller is swung, the orientation of the controller is changed, and the acceleration sensor of the controller detects a relatively great value of the acceleration. Therefore, when a player swings the controller, vibration based on the movement of the representative point 72 and vibration based on the value of the acceleration are simultaneously performed. Specifically, a vibration waveform of vibration based on the movement of the representative point 72, and a vibration waveform of the vibration based on the value of the acceleration are combined with each other, and a signal representing the combined waveform obtained through the combination is output to the controller.

An amplitude of the vibration based on the vibration patterns P13 to P21 is greater than an amplitude of the vibration based on the vibration patterns P1 to P12. Therefore, in a case where a player swings the controller, although a vibration waveform of the vibration based on movement of the representative point 72, and a vibration waveform of the vibration based on the value of the acceleration are combined with each other, a player more easily perceives the vibration (that is, vibration based on the swinging of the controller) based on the value of the acceleration. Further, in a case where vibration based on the value of the acceleration is generated, louder sound (sound generated by the shaker being swung) is output as compared to a case where vibration based on the movement of the representative point 72 is generated.

In the third game, the vibration pattern may be prepared such that the vibration pattern is different between a case where the controller is continuously swung, and a case where swinging of the controller is started. For example, the vibration patterns shown in FIG. 21 are used as the vibration patterns of the vibration based on the value of the acceleration when the controller is continuously swung. Meanwhile, when the swinging of the controller is started, that is, when the value of the acceleration which is not greater than a predetermined threshold value becomes greater than the predetermined threshold value, a vibration pattern that is different from those shown in FIG. 21 is used.

As described above, the vibrator of the controller vibrates according to a signal representing an input vibration waveform. Specifically, the input signal includes a frequency and an amplitude, and the vibrator vibrates at the input frequency and amplitude. In the exemplary embodiment, the virtual object (70, 71, 72) contacts with another object (virtual container 73 to 77), and the vibration pattern data is selected according to the state of movement of the virtual object in the case of the virtual object contacting with another object or in the case of the virtual object coming into contact with another object. A signal representing a vibration waveform based on the selected vibration pattern data is generated, and the signal is output from the main body apparatus 2 to the controller. The vibrator of the controller vibrates according to the signal. In a case where a plurality of vibration waveforms are simultaneously generated, the plurality of vibration waveforms are combined with each other, and a signal representing the combined waveform obtained through the combination is output, to vibrate the vibrator.

Since the plurality of vibration waveforms are combined with each other, in a case where, for example, a plurality of virtual objects move, the vibrator more strongly (more greatly) vibrates. Thus, a player is allowed to perceive movement of the plurality of virtual objects through vibration. The player is allowed to perceive various movements of the virtual object, and to more realistically experience vibration.

(Detail of Vibration Control)

Next, a process performed by the main body apparatus 2 for performing the above-described vibration control will be described in detail. Firstly, data output from the controller and data input to the controller will be described.

FIG. 22 is an example non-limiting diagram illustrating an example of data output from the controller. FIG. 23 is an example non-limiting diagram illustrating an example of data input to the controller. While the above-described game is being performed, the data shown in FIG. 22 is output from the left controller 3 and the right controller 4 to the main body apparatus 2 at predetermined time intervals (for example, every 5 m seconds). Further, while the above-described game is being performed, the data shown in FIG. 23 is input from the main body apparatus 2 to the left controller 3 and the right controller 4 at predetermined time intervals (for example, every 5 m seconds).

As shown in FIG. 22, the data output from the controller includes acceleration data D301 and angular velocity data D302. The acceleration data D301 represents an acceleration, in each axis direction, detected by the acceleration sensor (104, 114) of the controller. Further, the angular velocity data D302 represents an angular velocity, around each axis, detected by the angular velocity sensor (105, 115) of the controller.

Further, as shown in FIG. 23, the data input to the controller includes frequency data D401 and amplitude data D402. The frequency data D401 is for designating a frequency for vibrating the vibrator (107, 117) of the controller. The amplitude data D402 is for designating an amplitude for vibrating the vibrator of the controller.

(Detail of Process of Main Body Apparatus)

Figure 24:
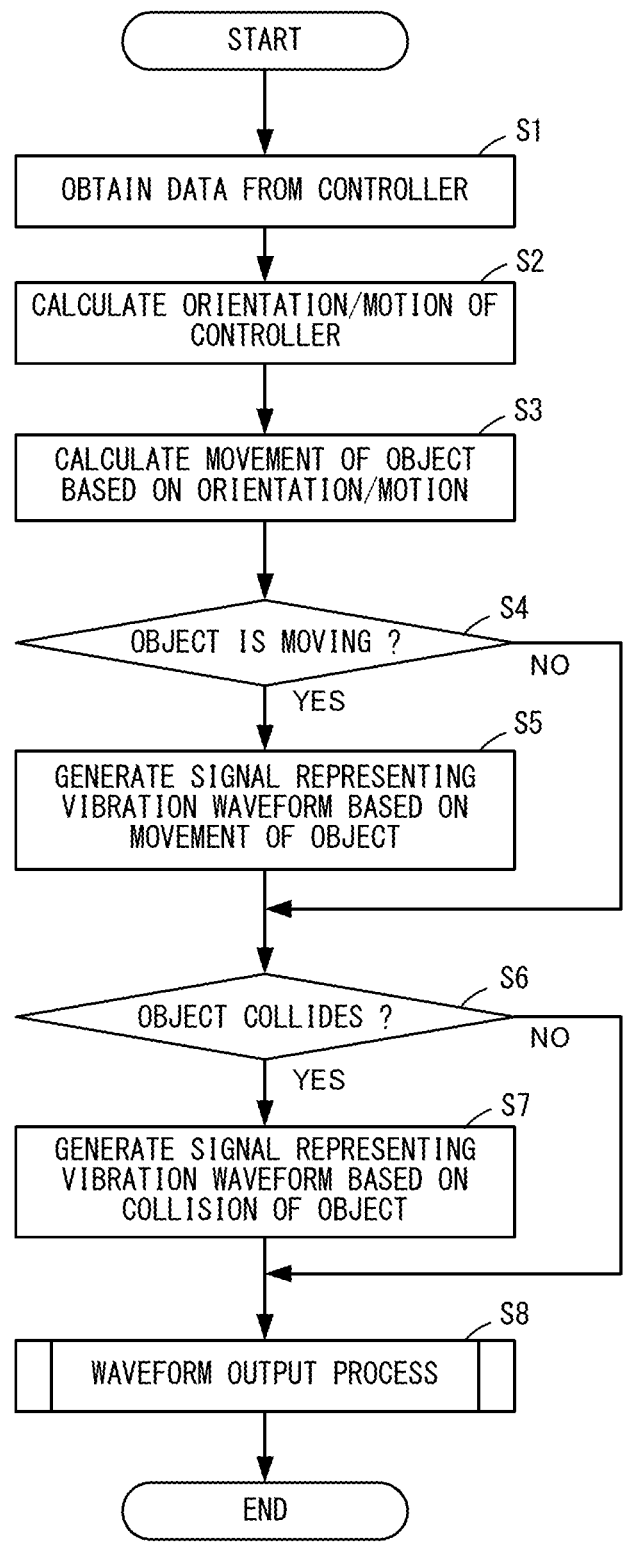
FIG. 24 is an example non-limiting flow chart showing in detail a process performed by the main body apparatus 2 when the first game or the second game is performed.

Next, a process performed by the main body apparatus 2 will be described in detail. FIG. 24 is an example non-limiting flow chart showing in detail a process performed by the main body apparatus 2 when the first game or the second game is performed. The process shown in FIG. 24 is performed by the CPU 81 of the main body apparatus 2 executing a predetermined game program. The main body apparatus 2 performs the process shown in FIG. 24 at predetermined time intervals (for example, every 5 m seconds).

As shown in FIG. 24, the main body apparatus 2 obtains the data shown in FIG. 22, from each controller (step S1). Next, the main body apparatus 2 calculates an orientation and motion of each controller based on data obtained from each controller in step S1 (step S2). Specifically, the main body apparatus 2 calculates an orientation and motion of each controller based on the acceleration data D301 and/or the angular velocity data D302.

Next, the main body apparatus 2 calculates movement of the virtual object based on the orientation and motion, of each controller, calculated in step S2 (step S3). For example, when the first game is being performed, the main body apparatus 2 defines the virtual containers 73, 74 corresponding to the controllers, respectively, and disposes one or more ball objects 70 in each of the virtual containers 73, 74. The main body apparatus 2 changes the orientations of the virtual containers 73, 74 according to the orientations of the controllers, respectively, and performs movement simulation for each ball object 70 in each of the virtual containers 73, 74. Thus, the position, the speed, the acceleration, the rotation, and the like of each ball object 70 in each of the virtual containers 73, 74 are calculated. Further, when the second game is being performed, the main body apparatus 2 calculates, by performing movement simulation for each dice object 71 in each of the virtual containers 75, 76, the position, the speed, the acceleration, the rotation, and the like of each dice object 71 in each of the virtual containers 75, 76.

The main body apparatus 2 determines whether or not the virtual object is moving, based on the result of the process step of step S3 (step S4). The main body apparatus 2 performs the determination of step S4 for each of the plurality of virtual objects. For example, when the first game is being performed, the main body apparatus 2 determines, for each of the plurality of the ball objects 70 in the virtual container 73, whether or not the ball object 70 is rolling on the bottom surface of the virtual container 73. The main body apparatus 2 performs the same determination for each of the plurality of the ball objects 70 in the virtual container 74. Furthermore, for example, when the second game is being performed, the main body apparatus 2 determines, for each of the plurality of the dice objects 71 in the virtual container 75, whether or not the dice object 71 is rolling in the virtual container 75. The main body apparatus 2 performs the same determination for each of the plurality of the dice objects 71 in the virtual container 76.

When it is determined that the virtual object is moving (step S4: YES), the main body apparatus 2 generates a signal representing the vibration waveform based on the movement of the virtual object (step S5). When a plurality of virtual objects are moving, the main body apparatus 2 generates a signal representing the vibration waveform for each of the moving virtual objects.

Specifically, the main body apparatus 2 performs the process step of step S5 at predetermined time intervals (every 5 m seconds), and sequentially reads the vibration pattern data representing the vibration waveforms which are previously stored, with the elapse of time, and sequentially reproduces the vibrations based on the vibration pattern data. More specifically, the main body apparatus 2 generates a signal representing a vibration waveform based on the vibration pattern data. The signal representing the vibration waveform includes a frequency and amplitude of the vibration. The signal is output to the controller and input to the vibrator, for example, every 5 m seconds. The vibrator of the controller receives the signal from the main body apparatus 2, and vibrates at the frequency and amplitude designated by the signal. That is, the frequency and amplitude of the vibration of the vibrator are changed every 5 m seconds. Thus, the vibrator of the controller vibrates so as to correspond to the vibration waveform indicated by the vibration pattern data.

For example, when the first game is being performed, the main body apparatus 2 generates, for each ball object 70 that is rolling on the bottom surface of the virtual container, a signal representing a vibration waveform based on the rolling, in step S5. Specifically, the main body apparatus 2 reads, from the memory, the previously stored vibration pattern data representing the vibration waveform based on rolling of the ball object 70, and generates a signal representing the vibration waveform based on the vibration pattern data. Further, when the second game is being performed, the main body apparatus 2 generates, for each dice object 71 that is rolling on the bottom surface of the virtual container, a signal representing a vibration waveform based on the rolling. Specifically, the main body apparatus 2 reads, from the memory, the previously stored vibration pattern data representing the vibration waveform based on the rolling of the dice object 71, and generates a signal representing the vibration waveform based on the vibration pattern data.

In a case where the process step of step S5 is performed, or in a case where the determination of step S4 is NO, the main body apparatus 2 determines whether or not the virtual object has collided (step S6). The main body apparatus 2 performs the determination of step S6 for each of the plurality of virtual objects. For example, when the first game is being performed, the main body apparatus 2 determines, for each of the plurality of the ball objects 70 in the virtual container 73, whether or not the ball object 70 has collided with the side surface of the virtual container 73. The main body apparatus 2 performs the same determination for each of the plurality of the ball objects 70 in the virtual container 74. Further, for example, when the second game is being performed, the main body apparatus 2 determines, for each of the plurality of the dice objects 71 in the virtual container 75, whether or not the dice object 71 has collided with the side surface of the virtual container 75. The main body apparatus 2 performs the same determination for each of the plurality of the dice objects 71 in the virtual container 76.

When it is determined that the virtual object has collided (step S6: YES), the main body apparatus 2 generates a signal representing a vibration waveform based on the collision of the virtual object (step S7). When the plurality of virtual objects have collided with the side surface of the virtual container, the main body apparatus 2 generates a signal (frequency and amplitude) representing a vibration waveform, for each of the virtual objects that have collided with the side surface of the virtual container. For example, when the first game is being performed, the main body apparatus 2 generates a signal representing a vibration waveform based on the collision, for each of the ball objects 70 that have collided with the side surface of the virtual container. Specifically, similarly to step S5, the main body apparatus 2 reads, from the memory, the previously stored vibration pattern data representing the vibration waveform based on the collision of the ball object 70, and generates a signal representing the vibration waveform based on the vibration pattern data. Further, when the second game is being performed, the main body apparatus 2 generates a signal representing the vibration waveform based on the collision, for each of the dice objects 71 that have collided with the side surface of the virtual container. Specifically, the main body apparatus 2 reads, from the memory, the previously stored vibration pattern data representing the vibration waveform based on the collision of the dice object 71, and generates a signal representing the vibration waveform based on the vibration pattern data.

When the process step of step S7 is performed or when the determination of step S6 is NO, the main body apparatus 2 performs a waveform output process (step S8). The waveform output process will be described below in detail.

Figure 25:
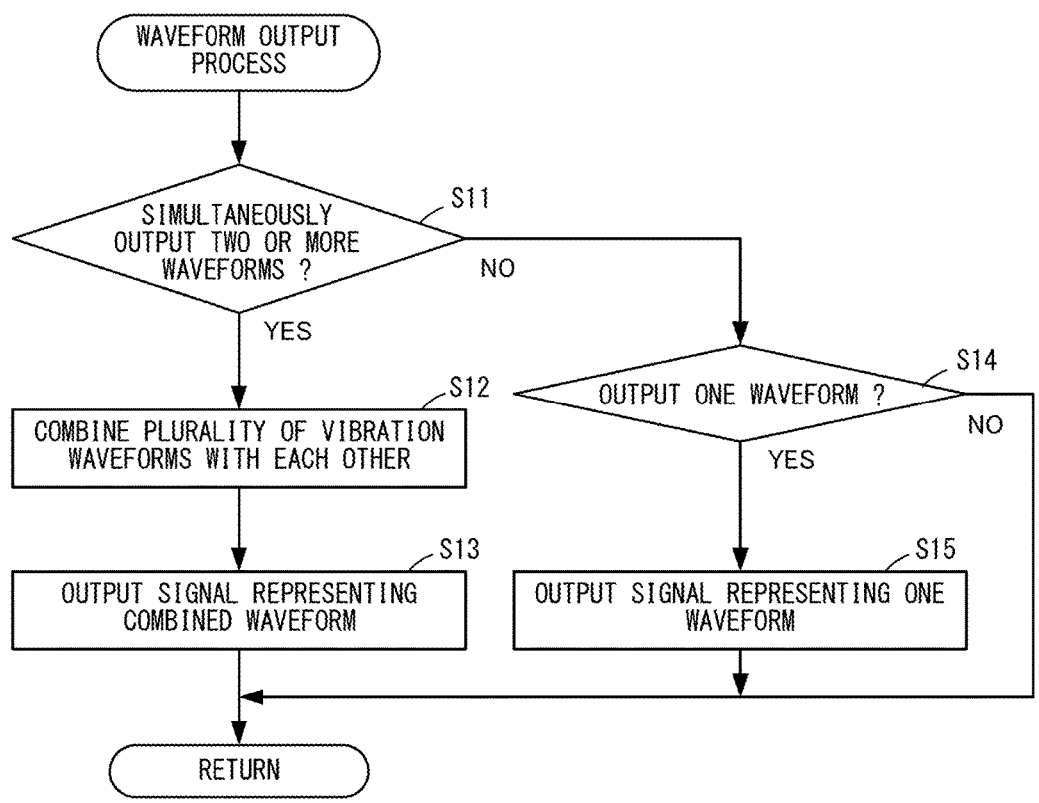
FIG. 25 is an example non-limiting flow chart showing in detail a waveform output process of step S8 in FIG. 24.

FIG. 25 is an example non-limiting flow chart showing in detail the waveform output process of step S8 in FIG. 24.

The main body apparatus 2 determines whether or not signals representing two or more vibration waveforms are to be simultaneously output (step S11). As described above, for example, in the first game, a plurality of the ball objects 70 may be in the virtual container, and signals based on a plurality of vibration waveforms may be generated in step S5 by the plurality of the ball objects 70 simultaneously rolling. Further, in the second game, since the two dice objects 71 are in the virtual container, signals based on a plurality of vibration waveforms may be generated in step S5. Further, in step S5, signals based on one or more vibration waveforms may be generated, and, also in step S7, signals based on one or more vibration waveforms may be generated. Thus, signals representing two or more vibration waveforms may be simultaneously output. Further, even if only one virtual object is present, for example, in a case where, before the present process loop, reproduction of vibration based on the vibration pattern data is started in step S5 by determination of step S4 being YES, and determination of step S6 is YES in the present process loop when the reproduction of the vibration has not been ended, reproduction of the vibration based on other vibration pattern data is started in step S7. Also in this case, signals representing two or more vibration waveforms are simultaneously output.

When it is determined that signals representing two or more vibration waveforms are simultaneously output (step S11: YES), the main body apparatus 2 combines a plurality of vibration waveforms with each other (step S12). Specifically, the main body apparatus 2 performs the calculation indicated below for a signal (frequency and amplitude) representing each vibration waveform generated in the present process loop. Firstly, the main body apparatus 2 calculates the total of the amplitudes of the respective vibration waveforms, as an amplitude Wa of the combined waveform. Next, the main body apparatus 2 calculates the total of the values obtained by multiplying the frequency of each vibration waveform by the amplitude thereof. A value obtained by dividing the total by the amplitude Wa of the combined waveform is calculated as a frequency Wf of the combined waveform.

For example, in a case where waveform 1 (frequency=Wf1, amplitude=Wa1) and waveform 2 (frequency=Wf2, amplitude=Wa2) are combined with each other, the main body apparatus 2 performs the following calculation.

Amplitude $Wa$ of combined waveform=$Wa1+Wa2$

Frequency $Wf$ of combined waveform=$(Wf1 \cdot Wa1 + Wf2 \cdot Wa2)/Wa$

Thus, the main body apparatus 2 calculates the total of amplitudes of a plurality of vibration waveforms, as the amplitude Wa of the combined waveform. Further, the main body apparatus 2 calculates a weighted average of frequencies of the plurality of vibration waveforms, thereby calculating the frequency Wf of the combined waveform.

Next, the main body apparatus 2 outputs, to the controller, a signal representing the combined waveform calculated in step S12 (step S13). Specifically, the main body apparatus 2 outputs, to the controller, the frequency data D401 shown in FIG. 23 as the frequency Wf of the combined waveform, and the amplitude data D402 as the amplitude Wa of the combined waveform.

Meanwhile, in a case where it is determined that signals representing two or more vibration waveforms are not simultaneously output (step S11: NO), the main body apparatus 2 determines whether or not a signal representing one vibration waveform is to be output (step S14). In a case where it is determined that a signal representing one vibration waveform is output (step S14: YES), the main body apparatus 2 outputs, to the controller, a signal representing one vibration waveform (step S15). Specifically, the main body apparatus 2 outputs, to the controller, the frequency data D401 as the frequency of one vibration waveform generated in step S5 or step S7 and the amplitude data D402 as the amplitude of the one vibration waveform generated in step S5 or step S7.

Figure 26:
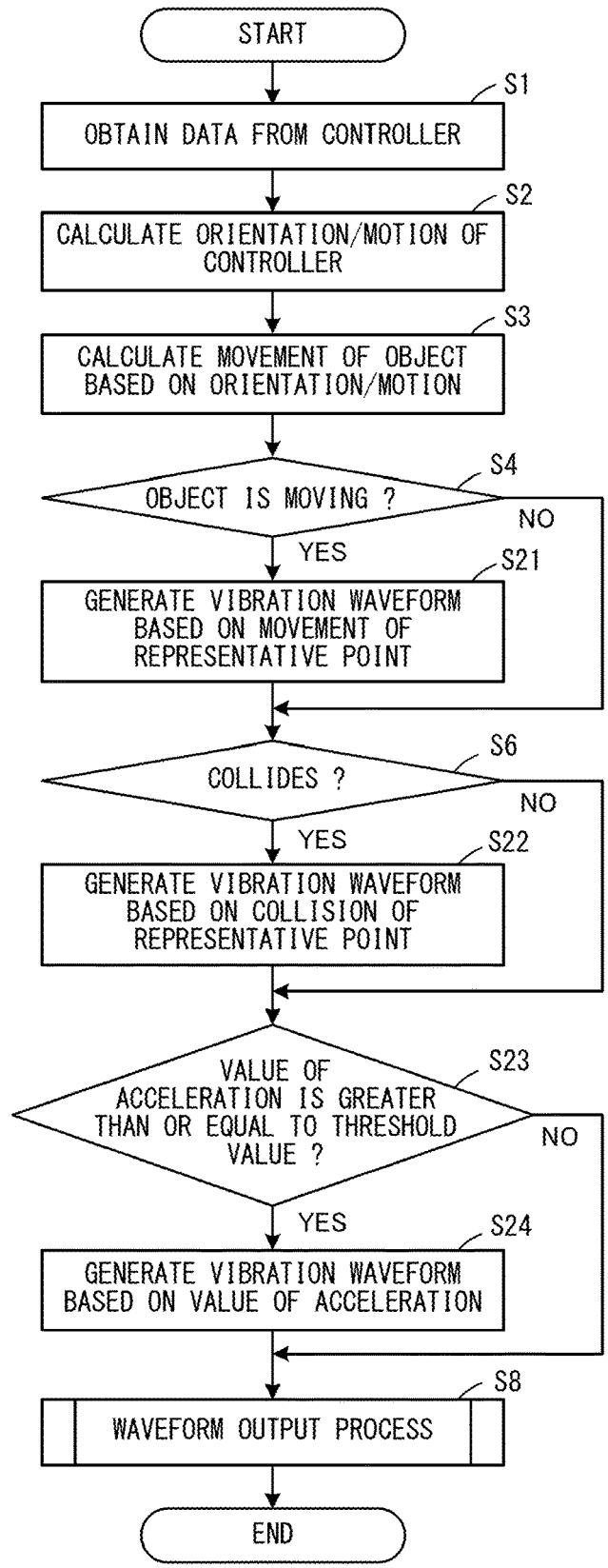
FIG. 26 is an example non-limiting flow chart showing in detail a process performed by the main body apparatus 2 when the third game is performed.

In a case where the process step of step S13 is performed, in a case where the process step of step S15 is performed, or in a case where the determination of step S14 is NO, the main body apparatus 2 ends the process step shown in FIG. 26.

(Detail of Process of Third Game)

Next, a process performed by the main body apparatus 2 when the third game is performed will be described in detail. FIG. 26 is an example non-limiting flow chart showing in detail a process performed by the main body apparatus 2 when the third game is performed. In FIG. 26, the same process steps as in FIG. 24 are denoted by the same step numbers, and the description thereof is not given. The main body apparatus 2 performs the process shown in FIG. 26 at predetermined time intervals (for example, every 5 m seconds).

As shown in FIG. 26, in a case where the determination of step S4 is YES, the main body apparatus 2 generates a vibration waveform based on the movement of the representative point 72 (step S21). In the description herein, the main body apparatus 2 selects, at random, the vibration pattern data of any of the vibration patterns P1 to P3 shown in FIG. 20, and generates a signal (frequency and amplitude) representing a vibration waveform based on the movement of the representative point 72, according to the selected vibration pattern data. At this time, the amplitude is adjusted according to the speed of the representative point 72. Specifically, the main body apparatus 2 multiplies the amplitude of the vibration waveform based on the selected vibration pattern data, by a value based on the speed of the representative point 72.

Further, in a case where the determination of step S6 is YES, the main body apparatus 2 generates a vibration waveform based on collision of the representative point 72 (step S22). In the description herein, the main body apparatus 2 selects the vibration pattern data of any of the vibration patterns P4 to P12 shown in FIG. 20 according to the speed of the representative point 72 at the collision. Specifically, the main body apparatus 2 determines whether the speed of the representative point 72 at the collision is "high", "medium", or "low". The main body apparatus 2 selects, at random, any one of the three pieces of the vibration pattern data according to the speed of the representative point 72, and generates a signal (frequency and amplitude) representing a vibration waveform based on the collision of the representative point 72, according to the selected vibration pattern data. At this time, the amplitude is adjusted according to the speed of the representative point 72. Specifically, the main body apparatus 2 multiplies the amplitude of the vibration waveform based on the selected vibration pattern data, by a value based on the speed of the representative point 72 at the collision.

In a case where the process step of step S22 is performed, or in a case where the determination of step S6 is NO, the main body apparatus 2 determines whether or not the value of the acceleration detected by the acceleration sensor of the controller is greater than or equal to a predetermined threshold value (step S23). Specifically, the main body apparatus calculates the magnitude of an acceleration vector represented by the value of the acceleration, in the three-axis directions, output by each controller, and determines whether or not the magnitude of the acceleration vector is greater than or equal to the predetermined threshold value.

In a case where it is determined that the value of the acceleration is greater than or equal to the predetermined threshold value (step S23: YES), the main body apparatus 2 generates a vibration waveform based on the value of the acceleration (step S24). In the description herein, the main body apparatus 2 selects the vibration pattern data of any of the vibration patterns P13 to P21 shown in FIG. 21, according to the value of the acceleration. Specifically, the main body apparatus 2 determines whether the value of the acceleration is "great", "medium", or "small". The main body apparatus 2 selects, at random, one of the three pieces of the vibration pattern data according to the value of the acceleration, and generates a signal (frequency and amplitude) representing a vibration waveform based on the value of the acceleration, according to the selected vibration pattern data. At this time, the amplitude is adjusted according to the value of the acceleration. Specifically, the main body apparatus 2 multiplies the amplitude of the vibration waveform based on the selected vibration pattern data, by the value based on the value of the acceleration.

As described above, by the process in FIG. 24 or FIG. 26 being repeatedly performed at predetermined time intervals, the vibrator of each controller can be vibrated so as to correspond to the combined waveform obtained by a plurality of vibration waveforms being combined with each other, or correspond to one vibration waveform.

The above-described process is merely an exemplary process, and, for example, the order in which the process steps are performed may be changed, another step may be added, or a part of the above-described process steps may be omitted.

Further, various modifications, described below, to the above-described exemplary embodiment may be made.

For example, in the above-described exemplary embodiment, the frequency of a combined wave is obtained in such a manner that the frequencies of the respective waveforms are weighted, and the weighted frequencies are averaged, and the amplitude of the combined wave is obtained by the amplitudes of the respective waveforms being added, to combine the plurality of waveforms with each other. However, a plurality of waveforms may be combined with each other by superposing the plurality of waveforms on each other. That is, a plurality of waveforms may be combined with each other according to the superposition principle of wave. In this case, the plurality of waveforms interfere with each other (a wave may is intensified or cancelled by another wave).

Further, in the above-described exemplary embodiment, as a signal representing a vibration waveform, a frequency and an amplitude are output from the main body apparatus 2 to each controller. A signal representing a vibration waveform may be separated into, for example, a signal (frequency and amplitude) in a high frequency band, and a signal (frequency and amplitude) in a low frequency band, and output. For example, the vibrators 107, 117 of the controllers may be each a linear vibration motor (also referred to as linear vibration actuator) that vibrates in a first direction at a first resonance frequency (for example, 320 Hz), and vibrates in a second direction at a second resonance frequency (for example, 160 Hz). Such a vibrator can vibrate at a frequency in a first frequency band (high frequency band) including the first resonance frequency, and can vibrate at a frequency in a second frequency band (low frequency band) including the second resonance frequency. The vibrator tends to strongly vibrate in the first direction at the first resonance frequency, and tends to strongly vibrate in the second direction at the second resonance frequency. Further, the vibrator can vibrate in a direction between the first direction and the second direction by a combined wave obtained by combining vibration in the high frequency band with vibration in the low frequency band, and can vibrate at a frequency in a band from the low frequency band to the high frequency band. In a case where such a vibrator is provided in the controller, the main body apparatus 2 may output, to the controller, a signal in the high frequency band and a signal in the low frequency band. For example, the main body apparatus 2 may transmit, to the controller, one packet including the signal in the high frequency band and the signal in the low frequency band, or may transmit these signals to the controller such that the signals are included in separate packets. The vibrator vibrates based on the received signal in the high frequency band and the received signal in the low frequency band. Further, the controller may include two linear vibration motors (first vibration motor having the first resonance frequency and second vibration motor having the second resonance frequency), and the main body apparatus 2 may output, to the controller, a signal in the high frequency band and a signal in the low frequency band. In this case, the controller vibrates the first vibration motor based on the received signal in the high frequency band, and vibrates the second vibration motor based on the received signal in the low frequency band.

Further, in the above-described exemplary embodiment, a frequency and an amplitude are output from the main body apparatus 2 to each controller, as a signal representing a vibration waveform, at predetermined time intervals (for example, every 5 m seconds). However, in another exemplary embodiment, a difference of the frequency and a difference of an amplitude may be output to the controller at predetermined time intervals. That is, a difference from the frequency output in the immediately preceding process loop may be output to the controller in the present process loop, and a difference from the amplitude output in the immediately preceding process loop may be output to the controller in the present process loop.

Further, in the above-described exemplary embodiment, a frequency and an amplitude are output from the main body apparatus 2 to each controller, as a signal representing a vibration waveform, at predetermined time intervals (for example, every 5 m seconds). However, in another exemplary embodiment, as a signal representing a vibration waveform, the vibration waveform itself may be output to the controller. For example, the vibration pattern data representing the vibration waveform is stored in the main body apparatus 2, and the vibration pattern data itself may be output from the main body apparatus 2 to the controller. Further, in another exemplary embodiment, a plurality of pieces of the vibration pattern data are stored in the controller, and information indicating the vibration pattern data based on which vibration is to be performed may be output, as a signal representing a vibration waveform, from the main body apparatus 2 to the controller. When each controller receives the signal from the main body apparatus 2, the vibration pattern data based on the signal may be selected, to vibrate the vibrator based on the vibration pattern data.

That is, in the exemplary embodiment, the signal representing the vibration waveform may be the frequency and the amplitude as described above, may be a difference in frequency and a difference in amplitude, or may be a vibration waveform itself (that is, the vibration pattern data representing vibration waveform). Further, the signal representing the vibration waveform may be a signal that designates the vibration pattern data (in other words, file in which the vibration patterns are stored).

Further, the above-described games are merely exemplary games, and another game may be performed. For example, any other virtual object as well as the spherical ball object and the cubic dice object may be used in the game. The shape of the virtual object is not limited to a sphere and a cube, and may be any shape. Further, the game is not limited to a game in which a virtual object is contained in a virtual container and moved in the virtual container, and may be a game in which a virtual object is moved in a virtual space in any manner.

Further, in the above-described game, two players or one player play the game. However, three or more players may play the above-described game or another game.

Further, in the above-described exemplary embodiment, the left and the right controllers 3 and 4 are separated from the main body apparatus 2 to play the game. However, in another exemplary embodiment, the above-described game (or another game) may be played in a state where the left and the right controllers 3 and 4 are mounted to the main body apparatus 2.

Further, in the above-described exemplary embodiment, the orientation of the controller is detected based on the data from the inertial sensor. However, the orientation of the controller may be detected in another manner. For example, an image of the controller is taken by using a camera, and the orientation of the controller may be detected based on the taken image.

Further, in the above-described exemplary embodiment, by changing the orientation of the controller, the virtual object is moved. In another exemplary embodiment, for example, the virtual object may be moved according to an operation on the button or the direction input section of the controller. Further, the virtual object may be moved according to an operation on the touch panel. That is, the virtual object may be moved according to an operation (an operation of tilting or swinging the operation section itself, an operation on the button, the direction input section, the touch panel, or the like) on the operation section.

Further, in the above-described exemplary embodiment, the virtual object is moved by changing the orientation of the virtual container according to an operation (operation of tilting or swinging the operation section itself, operation on the button, the direction input section, the touch panel, or the like) on the operation section. In another exemplary embodiment, the virtual object itself may be directly moved according to an operation on the operation section. For example, a virtual force may be applied to a virtual object according to an operation on the controller, to move the virtual object.

Further, in the above-described exemplary embodiment, a game is performed, and the movement of the virtual object is calculated in the game, and vibration is generated according to the movement of the virtual object. In another exemplary embodiment, vibration may be generated according to movement of any virtual object other than a virtual object in a game.

The above-described hardware configuration is merely an exemplary one. For example, an apparatus having the controller and the main body apparatus 2 integrated with each other may be used.

Although the exemplary embodiment has been described above, the exemplary embodiment is described merely as an example, and various modification and equivalent arrangements may be made.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.)

What is claimed is:

1. An information processing system comprising:
   operation device including at least one sensor;
   a vibrator connected to receive an input signal representing a vibration waveform, the vibrator being configured to vibrate according to the input signal representing the vibration waveform;
   a processor coupled to the at least one sensor, the processor being configured to sequentially calculate a virtual movement of a virtual object, and change the movement of the virtual object according to an operation the at least one sensor senses; and
   a waveform generator operatively coupled to the processor and configured to generate the input signal representing the vibration waveform based on a state, of a movement of the virtual object, obtained when the virtual object is in contact with another object, or comes into contact with another object, based on calculation by the processor, the waveform generator being further configured to output, to the vibrator, the input signal representing a combined waveform obtained by combining a first vibration waveform with a second vibration waveform, in a case where a signal representing the second vibration waveform is generated by the waveform generator when a signal representing the first vibration waveform is generated by the waveform generator.

2. The information processing system according to claim 1, wherein the processor is further configured to calculate an orientation and/or a motion in response to sensing by the at least one sensor, wherein
   the processor is further configured to change the movement of the virtual object in response to the sensing by the at least one sensor.

3. The information processing system according to claim 2, wherein
   the at least one sensor includes an inertial sensor, and
   the processor is configured to calculate the orientation and/or the motion of the inertial sensor based on data from the inertial sensor.

4. The information processing system according to claim 1, wherein the waveform generator generates a signal representing a vibration waveform based on a movement, of the virtual object, obtained when the virtual object is moving in a state where the virtual object is in virtual contact with said another object.

5. The information processing system according to claim 4, wherein the waveform generator generates a signal representing a vibration waveform having an amplitude that is directly proportional to the moving speed of the virtual object.

6. The information processing system according to claim 4, wherein
   the waveform generator generates, when a virtual collision of the virtual object with said another object occurs, a signal representing a vibration waveform based on the virtual collision of the virtual object, and
   the waveform generator outputs a signal representing a combined waveform obtained by combining a vibration waveform based on the movement of the virtual object with a vibration waveform based on the virtual collision of the virtual object.

7. The information processing system according to claim 1, wherein the waveform generator generates, when a virtual collision of the virtual object with said another object occurs, a signal representing a vibration waveform based on the virtual collision.

8. The information processing system according to claim 1, wherein
   the virtual object includes a virtual container object and at least one content object contained in the virtual container object, and
   the processor is configured to change a movement of the content object by changing an orientation and/or a motion of the virtual container object.

9. The information processing system according to claim 8, wherein
   the content object is a plurality of spherical objects, and
   the waveform generator generates, when rolling of the plurality of spherical objects in the virtual container object occurs, a signal representing a vibration waveform based on the rolling of each spherical object, and generates, when virtual collision of the plurality of spherical objects occurs, a signal representing a vibration waveform based on the collision of each spherical object.

10. The information processing system according to claim 8, wherein
the content object is modeled as a rectangular-parallelepiped-shaped object, and
the waveform generator generates, when collision of the rectangular-parallelepiped-shaped object with the virtual container object occurs, a signal representing a vibration waveform based on the collision.

11. The information processing system according to claim 8, wherein
the content object is a modeled as a virtual point or grain, and
the waveform generator generates, when a movement of the content object in the virtual container object is performed, a signal representing a vibration waveform based on the movement.

12. The information processing system according to claim 1, wherein the waveform generator combines a plurality of vibration waveforms with each other such that the number of the plurality of vibration waveforms is not greater than a predetermined upper limit number, and outputs, to the vibrator, a signal representing a combined waveform obtained through the combination.

13. The information processing system according to claim 1, wherein
the information processing system includes an information processing apparatus and an operation device,
the at least one sensor and the vibrator are provided in the operation device,
the processor and the waveform generator are provided in the information processing apparatus, and
the information processing apparatus receives an input from the at least one sensor and transmits an output from the waveform generator to the operation device, through communication with the operation device.

14. The information processing system according to claim 13, wherein a signal output from the waveform generator includes an amplitude of a waveform per unit time or a difference in an amplitude of a waveform per unit time, and a frequency of the waveform per unit time or a difference in a frequency of the waveform per unit time.

15. The information processing system according to claim 1, wherein the waveform generator is configured to generate, as the signal, data representing an amplitude and/or a frequency of vibration, and changes the amplitude and/or the frequency in a case where the state of the movement of the virtual object changes when a signal representing a vibration waveform based on the state of the movement of the virtual object is generated.

16. The information processing system according to claim 1, wherein
the processor is configured to calculate a value representing a movement of the virtual object,
a plurality of pieces of vibration pattern data representing the vibration waveform are prepared, and
the waveform generator selects any of the plurality of pieces of vibration pattern data according to the value, and generates a signal representing the vibration waveform, based on the selected vibration pattern data.

17. The information processing system according to claim 16, wherein the waveform generator is configured to generate, as the signal, data representing an amplitude and/or a frequency of vibration, and changes the amplitude and/or the frequency according to the value.

18. A non-transitory storage medium having stored therein an information processing program executed by a computer of an information processing apparatus that vibrates a vibrator which vibrates according to an input signal representing a vibration waveform, the computer being caused to execute:
sequentially calculating a virtual movement of a virtual object, and changing the movement of the virtual object according to an operation performed on an operation device including at least one sensor;
generating a signal representing a vibration waveform based on a state, of a movement of the virtual object, obtained when the virtual object is in contact with another object, or comes into contact with another object, based on calculation of the virtual movement; and
outputting, to the vibrator, a signal representing a combined waveform obtained by a first vibration waveform and a second vibration waveform being combined with each other, in a case where a signal representing the second vibration waveform is generated when a signal representing the first vibration waveform is generated.

19. The storage medium having stored therein the information processing program according to claim 18, wherein
the computer is caused to further calculate an orientation and/or a motion of the operation device, and
the movement of the virtual object is changed based on an orientation and/or a motion of the operation device.

20. The storage medium having stored therein the information processing program according to claim 18, wherein
the processor generates a waveform by generating a signal representing a vibration waveform based on a movement, of the virtual object, obtained when the virtual object is moving in a state where the virtual object is in contact with said another object.

21. The storage medium having stored therein the information processing program according to claim 20, wherein the processor generates a waveform by generating a signal representing a vibration waveform having an amplitude such that the higher a moving speed of the virtual object is, the greater the amplitude is.

22. The storage medium having stored therein the information processing program according to claim 20, wherein
the processor generates a waveform by generating, when a collision of the virtual object with said another object occurs, a signal representing a vibration waveform based on the collision of the virtual object, and
the processor controls outputting of a signal representing a combined waveform obtained by combining a vibration waveform based on the movement of the virtual object with a vibration waveform based on the collision of the virtual object.

23. The storage medium having stored therein the information processing program according to claim 18, wherein the processor generates a waveform by generating, when a collision of the virtual object with said another object occurs, a signal representing a vibration waveform based on the collision.

24. The storage medium having stored therein the information processing program according to claim 18, wherein
the virtual object includes a virtual container object and at least one content object contained in the virtual container object, and
the processor changes a movement of the content object by changing an orientation and/or a motion of the virtual container object.

25. An information processing apparatus that vibrates a vibrator which vibrates according to an input signal representing a vibration waveform, the information processing apparatus comprising;
- a processor configured to sequentially calculate a virtual movement of a virtual object, and change the movement of the virtual object according to an operation performed on an operation device including at least one sensor; and
- a waveform generator coupled to the processor, the waveform generator configured to generate a signal representing a vibration waveform based on a state, of a movement of the virtual object, obtained when the virtual object is in contact with another object, or comes into contact with another object, based on calculation by the processor, the waveform generator being further configured to output, to the vibrator, a signal representing a combined waveform obtained by combining a first vibration waveform and a second vibration waveform, in a case where a signal representing the second vibration waveform is generated by the waveform generator when a signal representing the first vibration waveform is generated by the waveform generator.

26. The information processing apparatus according to claim 25, wherein the processor is further configured to calculate an orientation and/or a motion of the operation device, wherein the processor changes the movement of the virtual object based on an orientation and/or a motion of the operation device.

27. The information processing apparatus according to claim 25, wherein the waveform generator generates a signal representing a vibration waveform based on a movement, of the virtual object, obtained when the virtual object is moving in a state where the virtual object is in contact with said another object.

28. An information processing method executed by an information processing system that vibrates a vibrator which vibrates according to an input signal representing a vibration waveform, the information processing method comprising:
- sequentially calculating a virtual movement of a virtual object, and changing the movement of the virtual object according to an operation performed on an operation device including at least one sensor;
- generating a signal representing a vibration waveform based on a state, of a movement of the virtual object, obtained when the virtual object is in contact with another object, or comes into contact with another object, based on the calculating; and
- outputting, to the vibrator, a signal representing a combined waveform obtained by combining a first vibration waveform and a second vibration waveform, in a case where a signal representing the second vibration waveform is generated while a signal representing the first vibration waveform is also generated.

* * * * *